United States Patent [19]

Taube

[11] 4,033,385
[45] July 5, 1977

[54] APPARATUS AND METHOD FOR FORMING DYNAMOELECTRIC MACHINE FIELD WINDINGS BY PUSHING

[75] Inventor: Donald R. Taube, Fort Wayne, Ind.

[73] Assignee: Essex Group, Inc., Fort Wayne, Ind.

[22] Filed: Sept. 2, 1976

[21] Appl. No.: 720,039

[52] U.S. Cl. .......................... 140/92.1; 242/1.1 R
[51] Int. Cl.² ..................... B21F 3/00; H02K 15/04
[58] Field of Search ................. 140/92.1; 242/1.1 R

[56] References Cited

UNITED STATES PATENTS

| | | | |
|---|---|---|---|
| 3,493,186 | 2/1970 | Arick | 242/1.1 R |
| 3,903,933 | 9/1975 | Arick et al. | 140/92.1 |

*Primary Examiner*—Lowell A. Larson
*Attorney, Agent, or Firm*—Robert D. Sommer; Lawrence E. Freiburger

[57] ABSTRACT

An apparatus and method for placing magnet wire in slots respectively defined by the blades of coil transfer apparatus thereby to form a dynamoelectric machine field winding. The wire is pushed through a rotating nozzle having a dispensing exit which directs the wire along at least a first predetermined path having sections respectively aligned with the open ends of two of the slots whereby the wire is pushed into the two slots. The relationship of the rate of wire pushing to the nozzle angular velocity is selectively controlled to determine the size and shape of the predetermined path and hence the desired configuration of the resulting coil. In a preferred apparatus and method, the nozzle is rotated at alternately increasing and decreasing speeds while the wire is pushed at a constant rate to form a coil having an alternately increasing and decreasing the nozzle. The radial spacing of the dispensing exit from the rotational axis of the nozzle and the location of the rotational axis relative to the slots may also be selectively controlled. In the preferred apparatus, two nozzles rotating in synchronism with one another are employed to simultaneously direct two wires into diametrically opposite sets of slots defined by the blades of coil transfer apparatus arranged in a cylindrical array thereby to simultaneously form a first two coils of one like configuration and to subsequently form at least two additional coils of a different like configuration each serially connected to a respective one of the first two coils. Upon indexing of the coil transfer apparatus into another angular position, the operating cycle of the apparatus may be repeated to form further sets of coils pushed into other sets of slots.

36 Claims, 20 Drawing Figures

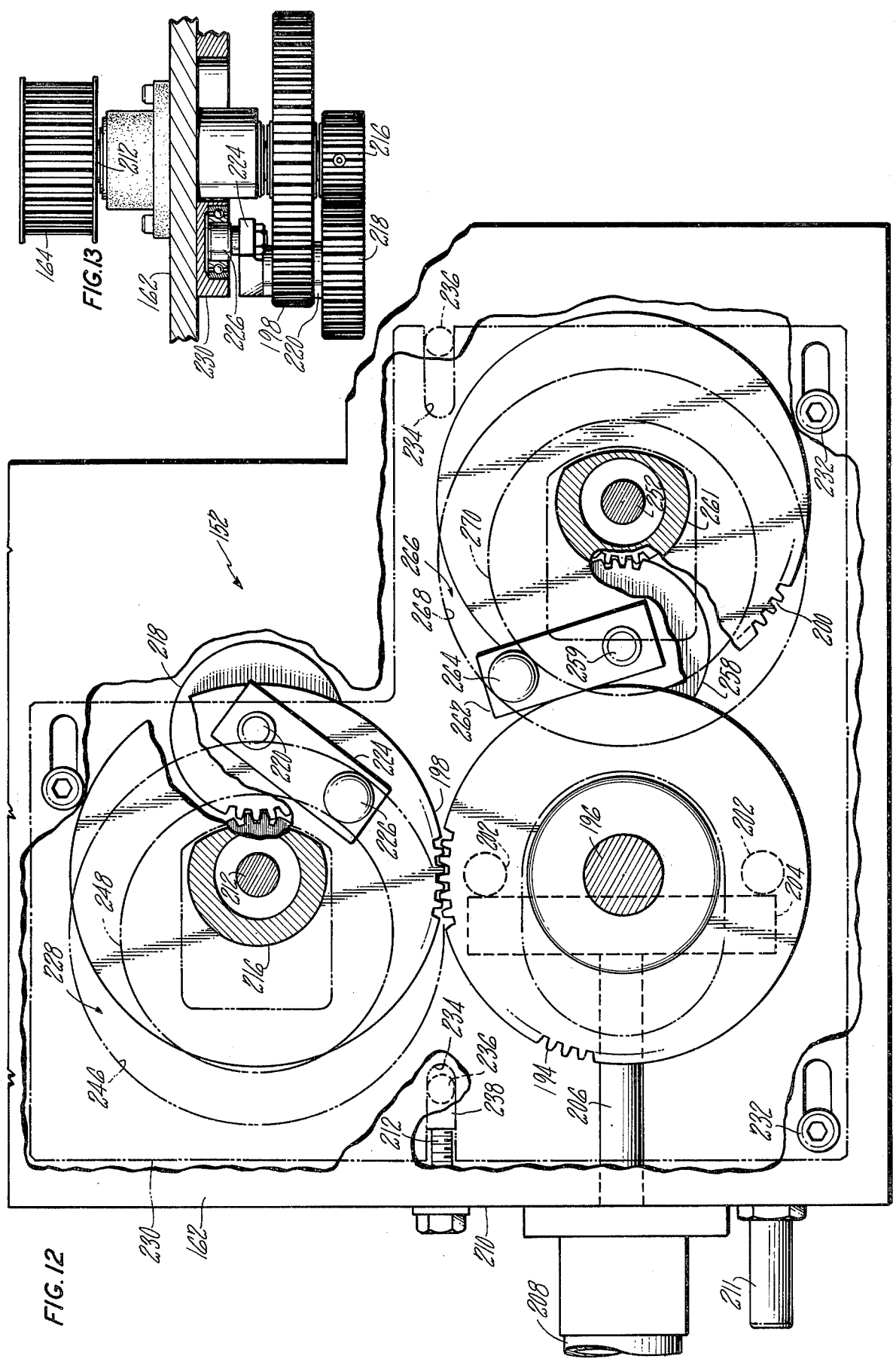

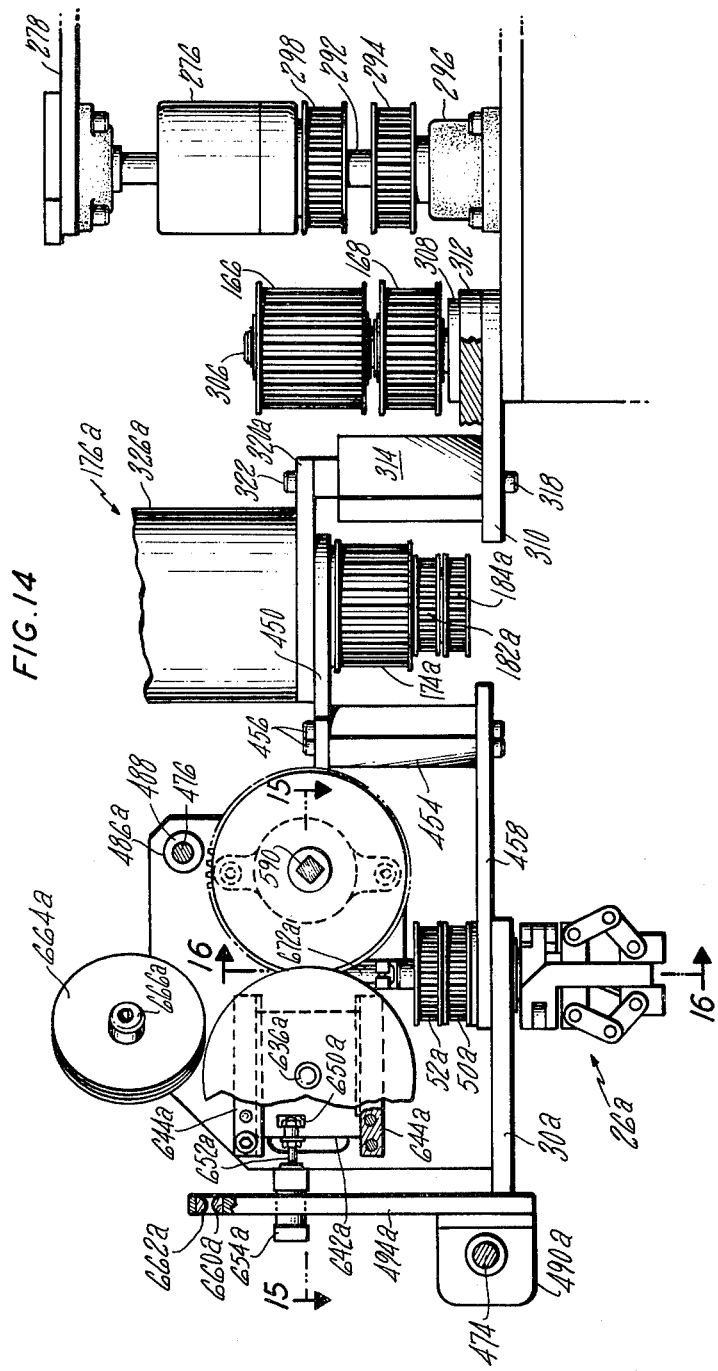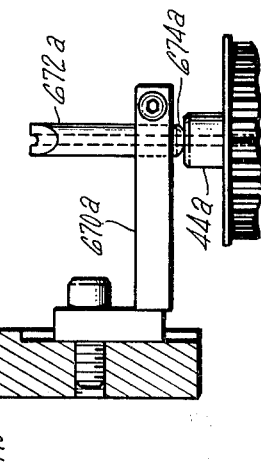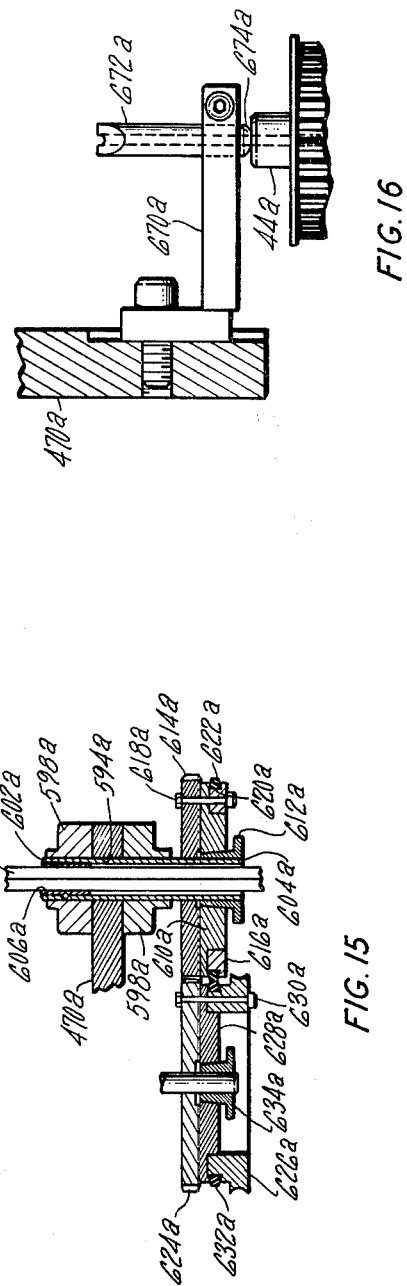

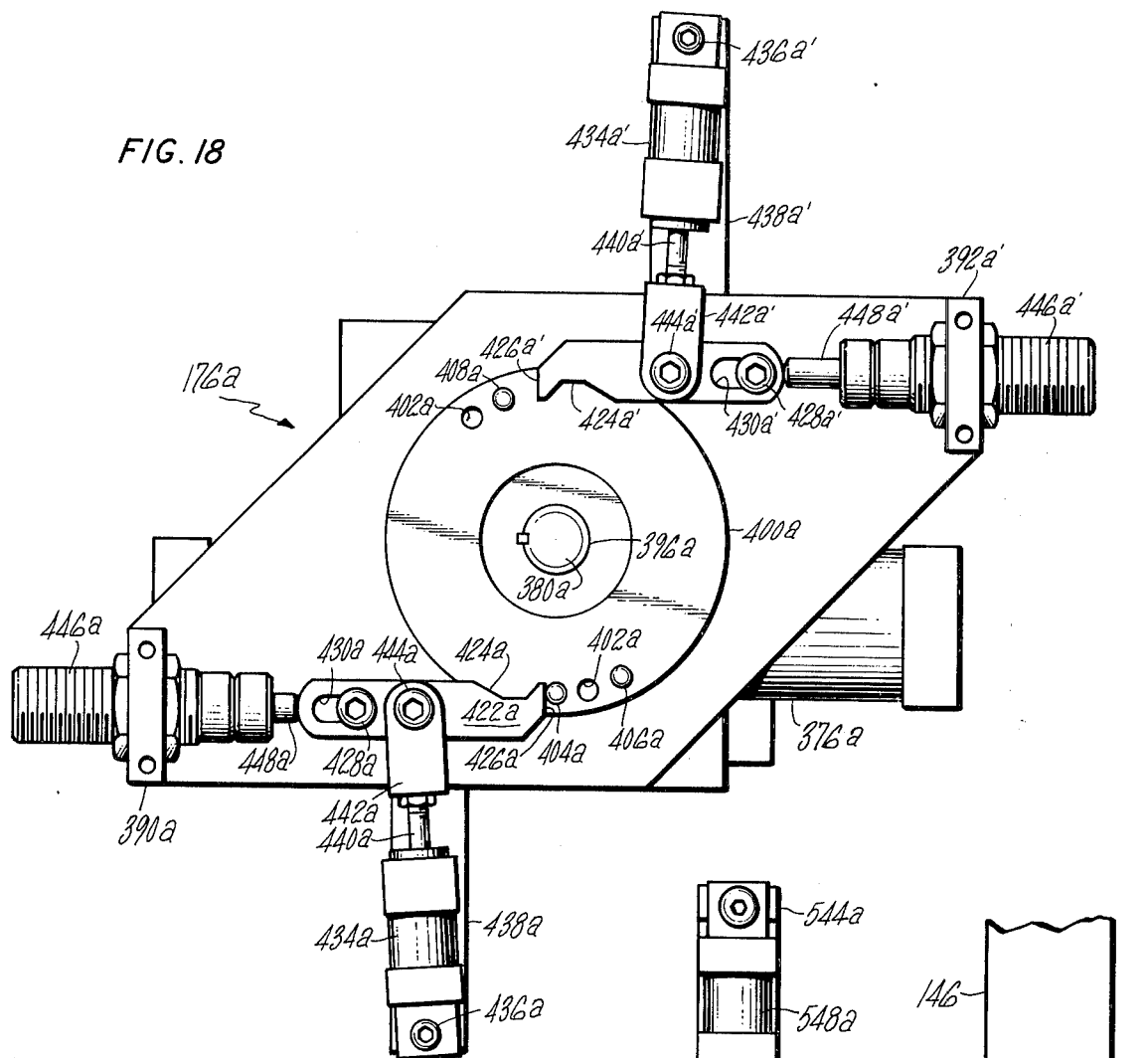

APPARATUS AND METHOD FOR FORMING DYNAMOELECTRIC MACHINE FIELD WINDINGS BY PUSHING

BACKGROUND OF THE INVENTION

This invention relates to an apparatus and method for forming dynamoelectric machine field windings, and more particularly to an apparatus and method for directly forming such windings in the slots defined by the blades of coil transfer or insertion apparatus. More specifically, the invention pertains to an apparatus and method for forming such windings with selected numbers of interconnected groups of concentrically disposed coils having selectively variable configurations depending upon the number of poles and the length of the stator core of the dynamoelectric machine to be wound.

Conventional methods for placing dynamoelectric machine field windings in the slots of a stator core are of two general types: the first involving the winding of coils directly into the slots of the core; the second involving the prewinding of coils, the transfer of the prewound coils onto the blades of coil insertion apparatus, and the insertion therefrom into the slots of the core. In the Arick et al U.S. Pat. No. 3,903,933 dated Sept. 9, 1975 and in the Vogel et al U.S. Application Ser. No. 590,158 filed June 25, 1975, now Pat. No. 3,985,163, the disclosures of which are incorporated herein by reference, there are disclosed methods for directly winding coils in the slots defined by the blades of coil transfer apparatus by pushing magnet wire through guide means movable in a predetermined path relative to the blades of the coil transfer apparatus. The apparatus and methods disclosed by the aforesaid U.S. patent and application afford distinct advantages over conventional apparatus and methods for placing windings in the slots of a stator core. In particular, such apparatus and methods do not involve the winding or wrapping of the magnet wire under tension around an element but instead employ a gentle pushing process of placing the magnet wire onto the blades of coil transfer apparatus which subjects the wire to far less abuse than the prior apparatus which would wire under tension. Since the thickness and composition of the insulation coating on magnet wire is dictated in part by the tension and abrasion to which the wire is subjected, a winding forming apparatus and method which does not involve the winding of wire under tension around an element permits the use of less costly magnet wire having insulating coatings of the required electrical properties but of less thickness or abrasion resistance.

Although the apparatus of the aforesaid U.S. Pat. No. 3,903,933 and U.S. Application Ser. No. 590,158 are well suited for forming certain types of windings for dynamoelectric machines, there is a need for an apparatus and methods of similar character which may be automatically controlled for forming complete sets of windings with various numbers of interconnected groups of concentrically disposed coils having various configurations without requiring any major change in the winding apparatus configuration or setup. The induction motors which probably comprise the majority of dynamoelectric machines manufactured at this time utilize a stator core having a number of angularly spaced apart slots within which coils of wire are arranged to form two or more pole winding groups. Each pole winding group generally comprises a plurality of coils of different sizes concentrically arranged with respect to the same radial polar center on the stator core. Different sizes or configurations of the coils are required for motors of different sizes as well as for motors having different numbers of poles.

SUMMARY OF THE INVENTION

Accordingly, it is a general object of the present invention to provide an improved apparatus and method for placing magnet wire in slots respectively defined by spaced blades of coil transfer apparatus thereby to form dynamoelectric machine field windings.

Another object of the present invention is to provide an improved apparatus and method for forming at a high rate of speed by pushing dynamoelectric machine field windings comprising groups of serially connected, concentrially disposed coils of different configurations, positioned on coil transfer apparatus in a predetermined manner required for subsequent use of the groups of coils.

A further object of the present invention is to provide an improved apparatus for forming by pushing concentric type windings for motors of different sizes having different numbers of poles without requiring any major change in the structure and setup of the apparatus and which may be automatically controlled to vary the number of coils comprising a winding as well as the sizes of such coils and the number of turns in each such coil.

A still further object of the present invention is to provide an improved apparatus and method for forming by pushing noncircular dynamoelectric machine field windings positioned in the slots respectively defined by the spaced blades of coil transfer apparatus.

An apparatus constructed in accordance with the principles of the invention and usable to practice the method of the invention in placing magnet wire in slots respectively defined by the spaced blades of coil transfer apparatus to form a dynamoelectric machine field winding employs means for pushing the wire through a rotating nozzle having a dispensing exit which directs the pushed wire along a predetermined path having sections respectively aligned with the open ends of two of the slots whereby the wire is pushed into the two slots. Means providing a selectively adjustable relationship between the rate at which the wire is pushed and the angular velocity of the nozzle determine the size and shape of the predetermined path and hence the desired configuration of the resulting coil. In accordance with one aspect of the invention, a speed-changing mechanism is employed to rotate the nozzle at alternately increasing and decreasing speeds in a cyclical manner during each revolution of the nozzle to form a coil having an alternately increasing and decreasing radius in relation to the rotational axis of the nozzle to thereby form a noncircular coil. In accordance with another aspect of the invention, means are employed for selectively moving the dispensing exit radially with respect to the rotational axis of the nozzle and cooperate with means for selectively shifting the location of the rotational axis of the nozzle relative to the blades of the coil transfer apparatus to provide for pushing of wire into different sets of slots.

In the preferred embodiment of the invention, two nozzles rotating in synchronism with one another are employed to simultaneously direct to wires into diametrically opposite sets of slots defined by the blades of coil transfer apparatus arranged in a cylindrical array thereby to simultaneously form two coils of like configuration disposed in different sets of slots. The apparatus is selectively adjustable to form additional coils disposed in other different sets of slots without severing the wires from which the respective coils are formed, and its operating cycle may be repeated upon indexing of the coil transfer apparatus into another angular position with selected slots positioned to receive still further coils.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 12 is a top cross-sectional view taken generally along the line 12—12 of FIG. 11;

FIG. 13 is a side cross-sectional view taken generally along the line 13—13 of FIG. 9 with certain parts omitted;

FIG. 14 is a side elevational view, with parts broken away and parts in section, taken generally along the line 14—14 of FIG. 9;

FIG. 15 is a fragmentary top cross-sectional view taken generally along the line 15—15 of FIG. 14;

FIG. 16 is a fragmentary cross-sectional view taken generally along the line 16—16 of FIG. 14;

FIG. 18 is a top view with certain parts omitted of one differential assembly of the apparatus of FIG. 8;

FIG. 19 is a top view of one carriage shifting mechanism of the apparatus of FIG. 8.

DESCRIPTION OF THE PREFERRED EMBODIMENT

Figure 1:
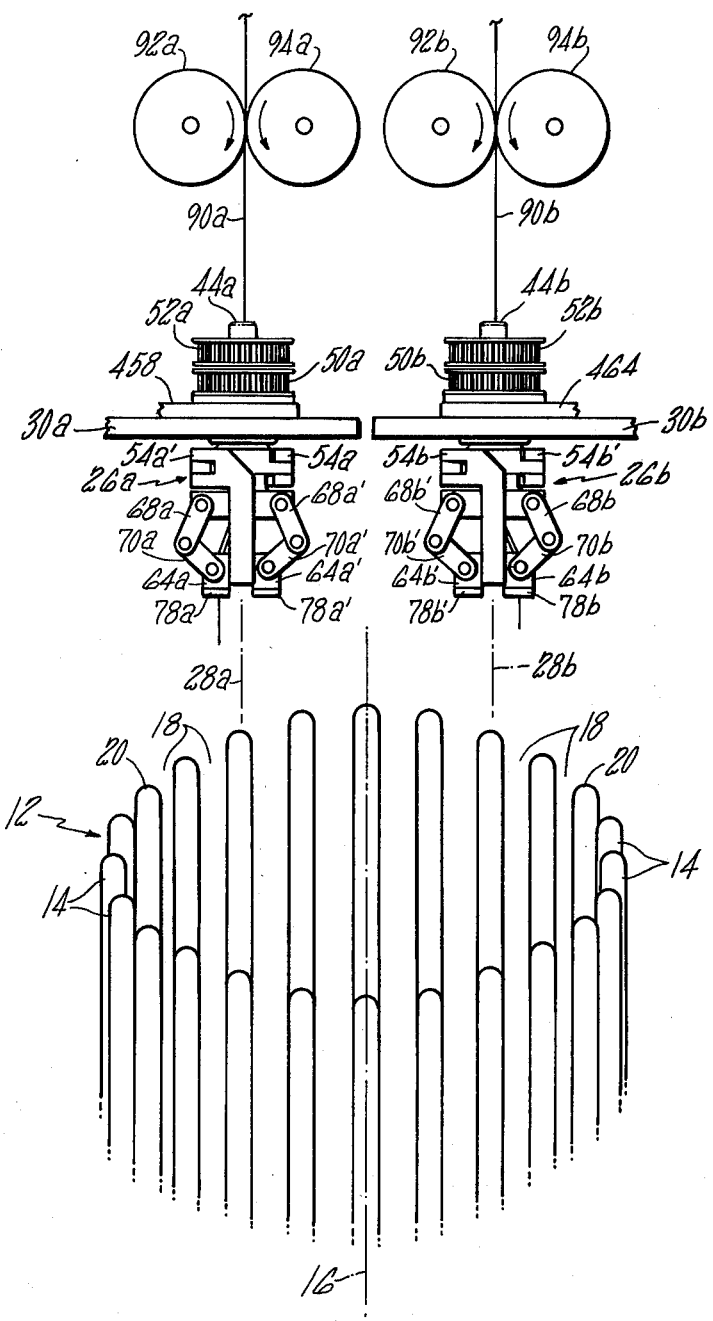
FIG. 1 is a simplified fragmentary view, partially in front elevation and partially in perspective, of one embodiment of the improved winding forming apparatus of the invention in conjunction with the blade assembly of conventional coil transfer apparatus.

A somewhat general description of the improved winding forming apparatus of the invention and the operating method of this apparatus will be first given in connection with FIGS. 1 through 7. This apparatus includes a number of corresponding lefthand and righthand assemblies having corresponding elements which are identified by like reference numerals with the respective suffixes a and b.

Referring now to the drawings, attention is first directed to FIG. 1 showing a simplified fragmentary representation of the improved winding forming apparatus, generally indicated at 10, in conjunction with the blade or finger assembly 12 of conventional coil transfer apparatus. The blade assembly 12 includes a circular array of blades 14 which line on an imaginary cylinder having an axis 16 and define slots 18 therebetween. The blades 14 have distal ends 20 and proximal ends 22 mounted on a support member 24 (see FIG. 7) which is rotatable about the axis 16. The blade assembly 12 may be of the general type shown in U.S. Pat. No. 3,324,536 for cooperation with coil and wedge pushing apparatus to transfer windings from the blade assembly 12 to a stator core member in the manner described in the aforesaid U.S. Pat. No. 3,324,536. The blade assembly 12 may also be intermediate coil transfer apparatus of the general type shown in U.S. Pat. No. 3,686,735. It will be understood that the blades of such coil transfer apparatus may take various forms and may be arranged in arcuate or other linear arrays as well as in a circular array.

The winding forming apparatus 10 includes two identical wire dispensing nozzle assemblies 26a, 26b having their respective axes 28a, 28b in parallel but diametrically opposite spaced relationship with the axis 16 of the circular array of blades 14. The nozzle assemblies 26a, 26b are supported above the blades 14 by respective mounting plates 30a, 30b which are slidably mounted for lateral movement generally radially to the axis 16. The mounting plates 30a, 30b with their respective nozzle assemblies 26a, 26b are radially movable with respect to the axis 16 of the circular array of blades 14 between selected positions by means hereinafter more fully described.

Figure 2:
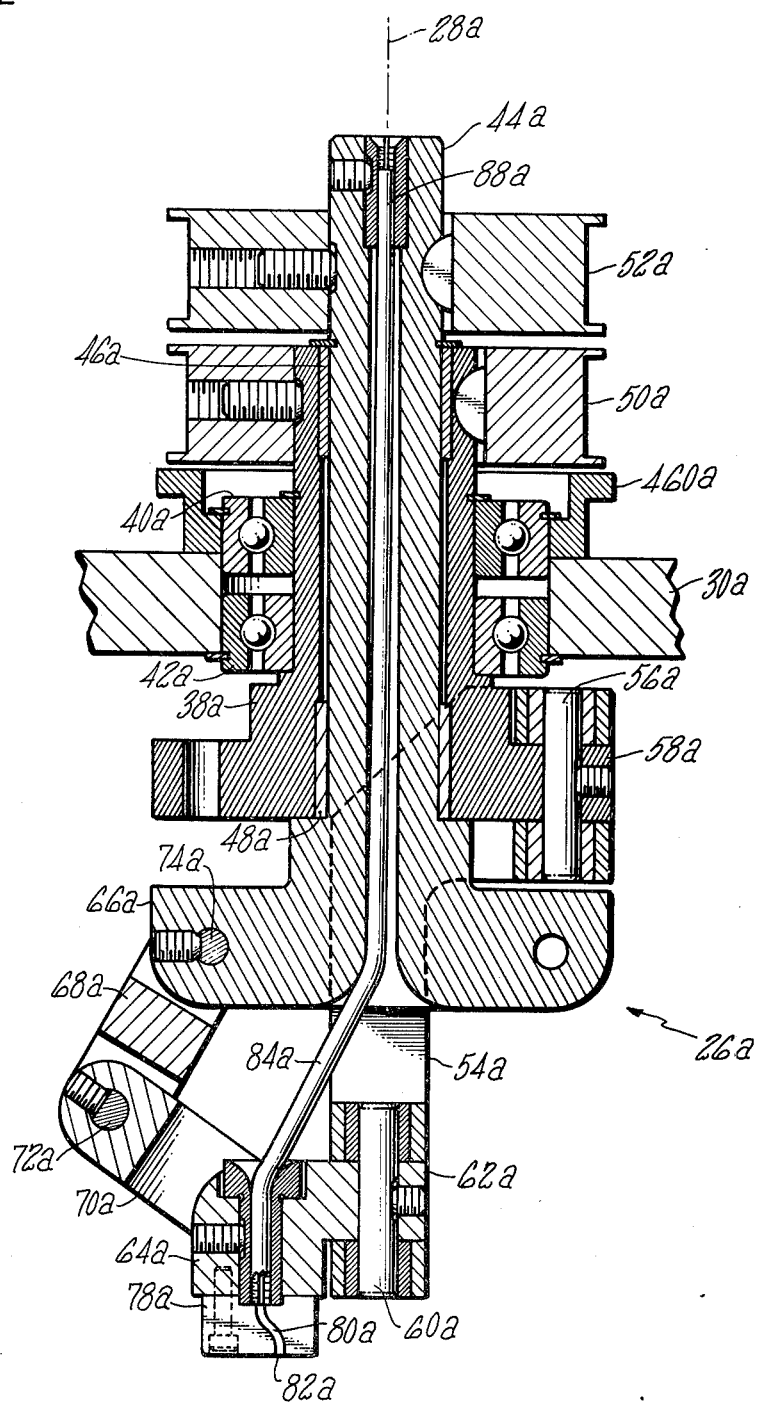
FIG. 2 is an enlarged cross-sectional view with certain parts omitted of one nozzle assembly of FIG. 1.
Figure 3:
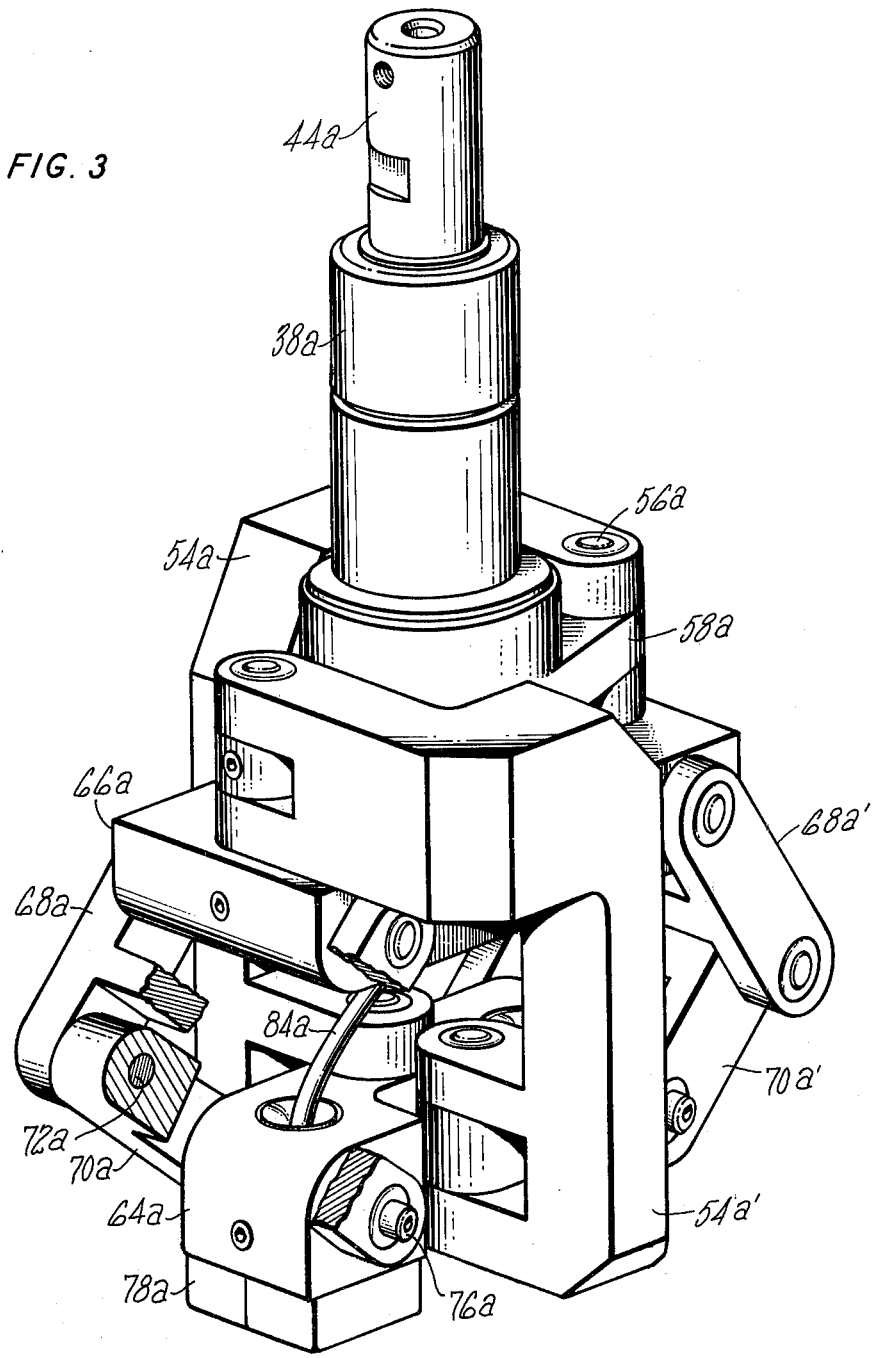
FIG. 3 is an enlarged perspective view of one nozzle assembly depicted in the preceding figures with certain parts omitted.
Figure 4:
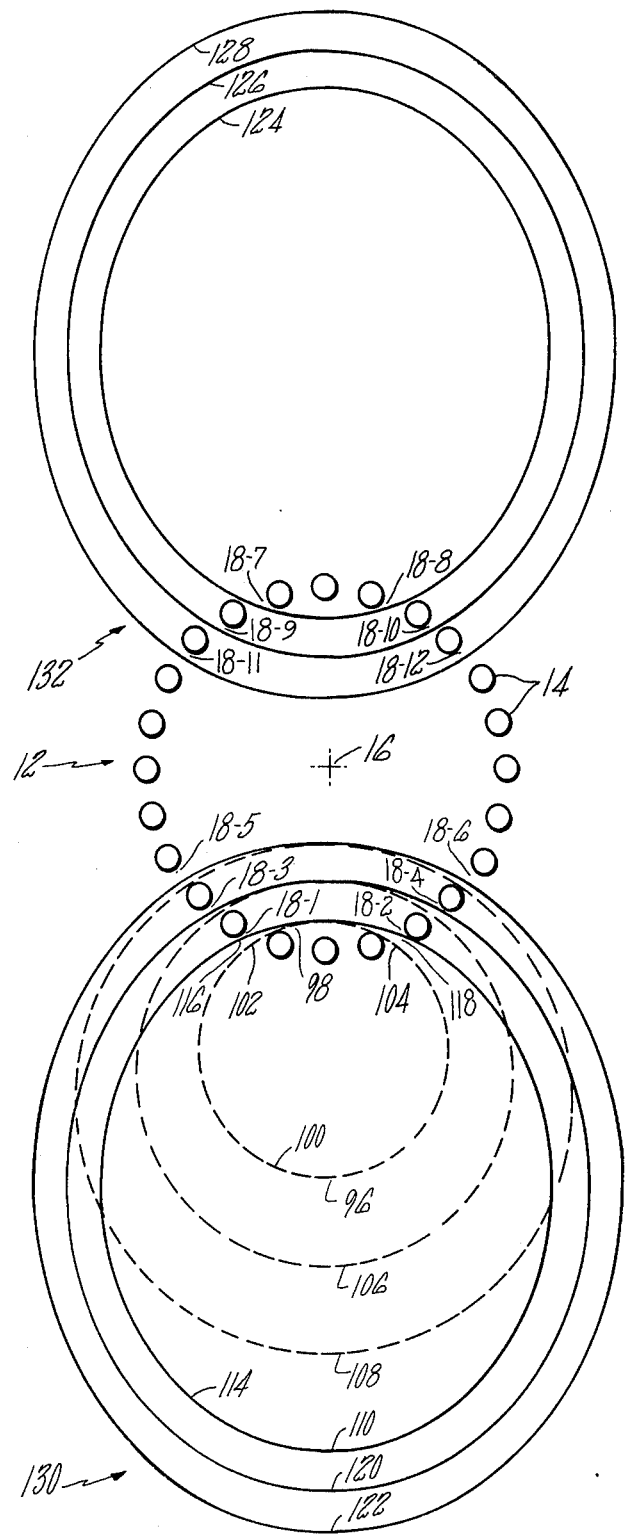
FIG. 4 is a schematic view of a plurality of coils placed on the blade assembly of FIG. 1 according to examples of the method of the invention.

Nozzle assemblies 26a, 26b are identical and thus a description of nozzle assembly 26a will suffice. Referring more particularly to FIGS. 2 and 3, the nozzle assembly 26a includes an outer spindle 38a rotatably supported in mounting plate 30a by bearings 40a, 42a and an inner spindle 44a rotatably supported within the outer spindle 38a by bearings 46a, 48a. Suitable toothed drive pulleys 50a, 52a are mounted, respectively, on the outer spindle 38a and the inner spindle 44a, and are rotatably driven in unison at the same speed in a manner as will hereinafter be more fully described. An operating link 54a has one end pivotally connected by a pin 56a to an outwardly extending flange 58a on the outer spindle 38a, the other end thereof being pivotally connected by a pin 60a to an ear 62a extending from a nozzle block 64a. The nozzle block 64a is drivingly connected to an outwardly extending flange 66a on the inner spindle 44a by a linkage comprising two links 68a, 70a pivotally interconnected by means of a pin 72a. The upper link 68a is pivotally connected by a pin 74a to the flange 66a and the lower link 70a is pivotally connected by a pin 76a to the nozzle block 64a.

Secured to the nozzle block 64a is a wire dispensing nozzle 78a which has a bore 80a extending therethrough and terminating in a wire dispensing exit or end 82a disposed above the blade assembly 12. The opposite end of the bore 80a communicates with one end of a flexible tube 84a mounted in the nozzle block 64a. The tube 84a extends from the nozzle block 64a into the passage 86a thorough the inner spindle 44a and has its opposite end 88a fixed in the upper end of the spindle 44a. Magnet wire 90a is pushed into the end 88a of the tube 84a and out of the dispensing end 82a of the nozzle 78a by means such as the pair of rollers 92a, 94a shown in FIG. 1 or by the pushing means to be hereinafer more fully described. It will also be apparent that the pushing means may take other forms such as the arrangement (not shown) of an endless belt trained around a set of rollers disclosed in the aforesaid U.S. Pat. No. 3,903,933.

The radial spacing of dispensing end 82a from the axis 28a about which the nozzle assembly 26a rotates may be changed by rotating the outer spindle 38a relative to the inner spindle 44a so as to change the angular relationship of the spingles. The means for accomplishing this result includes the linkage comprising operating link 54a and the links 68a, 70a. Although preventing angular movement of the nozzle block 64a relative to the inner spindle 44a, the links 68a, 70a permit radial movement of the nozzle block 64a relative to the axis 28a along an imaginary line which intersects the axis 28a. The axis of the pin 60a in the ear 62a is laterally offset from the imaginary line intersecting the dispensing end 82a and the axis 28a, and is therefoe movable along a second imaginary line parallel to but spaced from the former imaginary line. Rotation of the outer spindle 38a to the inner spindle 44a causes the operating link 54a to swing about the pin 60a. Since the axes of the pins 56a, 60a are spaced apart a predetermined distance, a force is imparted to the nozzle block 64a through the operating link 54a so as to move the nozzle block 64a radially with respect to the axis 28a. It will be apparent that such radial movement of the nozzle block 64a may be effected while the spindles 38a, 44a are rotating in unison at normal operating speeds by merely altering the angular relationship of the two spindles. For high speed operation of the nozzle assembly 26a, it is desirable to employ a counterbalance weight which may conveniently take the form of a second nozzle block 64a' and a second nozzle 78a' supported in diametrically opposite spaced relationship with the nozzle block 64a and the nozzle 78a by a corresponding second linkage comprising an operating link 54a' and two links 68a', 70a' for radial movement in a direction opposite to that of the nozzle lock 64a.

In operation of the winding forming apparatus 10 shown in FIG. 1, the nozzle assemblies 26a, 26b are rotated in synchronism with one another about their respective rotational axes 28a, 28b as wires 90b, 90b are continuously pushed through the respective nozzles 78a, 78b. Each of the rotating nozzles 78a, 78 directs or casts the wire exiting from its respective dispensing end 82a, 82b into loops or coils of predetermined size which enter and accumulate in slots 18 of the blade assembly 12. The size of any particular coil formed by the nozzle assembly 26a and its disposition in a particular pair of slots 18 depend upon the radial spacing of its dispensing end 82a from its axis of rotation, the spacing of axis 28a from the central axis 16 of the blade assembly 12, the rotational speed of the nozzle 78a, and the rate at which wire 90a is pushed through the nozzle by the rollers 90a, 92a. It will be obvious that a circular coil will be formed when the ratio of the rate of wire advance through the nozzle 78a and the rotational speed of the nozzle 78a is maintained at a constant value. One such circular coil indicated by a dashed line at 96 in FIG. 4 has arcuate sections 98, 100, respectively, within and outside the circular array of blades 14 and joined by intervening sections 102, 104 which are respectively disposed in the slots 18-1 and 18-2. Increasing the radial spacing of dispensing end 82a from axis 28a and increasing the spacing between axes 16 and 28a while increasing the rate of wire advance through the nozzle 78a results in the formation of a larger diameter coil 106 passing through the slots 18-3 and 18-4. If desired, a circular coil 108 of still greater diameter passing through slots 18-5 and 18-6 may be formed by further increasing the radial spacing of dispensing end 82a from axis 28a and further decreasing the spacing between axes 16 and 28a while further increasing the rate of wire advance through the nozzle 78a. It will be understood that a similar set of coils (not shown) could be similarly formed at the same time by rotation of the nozzle assembly 26b and disposed in the respective pair of slots: 18-7, 18-8, 18-9, 18-10; and 18-11, 18-12.

It is to be noted that the arcuate section 98 of coil 96 disposed within the array of blades 14 and an opposite coil section of corresponding length comprise the coil end turns when the connecting sections are placed in the slots of a stator (not shown). The coils of circular shape shown in FIG. 4 therefore are not well suited for placement in the slots of long stack length stators which require coils with considerably longer connecting sections between the end turn sections. According to the method of the present invention, the nozzle assemblies 26a, 26b may be employed to form coils of varying radii having substantially longer connecting sections than those provided by circular coils. According to the principles of this invention, the ratio of the rotational speed of each nozzle assembly to the rate of wire advance through the nozzle assembly is alternately increased and decreased during each revolution of the nozzle assembly. This result is preferably accomplished by pushing the wire through the nozzle assembly at a constant rate while rotating the nozzle assembly at alternately increasing and decreasing speeds. As the speed of each wire dispensing end 82a, 82b is increased, the radius of the coil being formed is successively decreased and, conversely, when the speed of the wire dispensing end is decreased, the radius of the coil being formed is successively increased.

Figure 5:
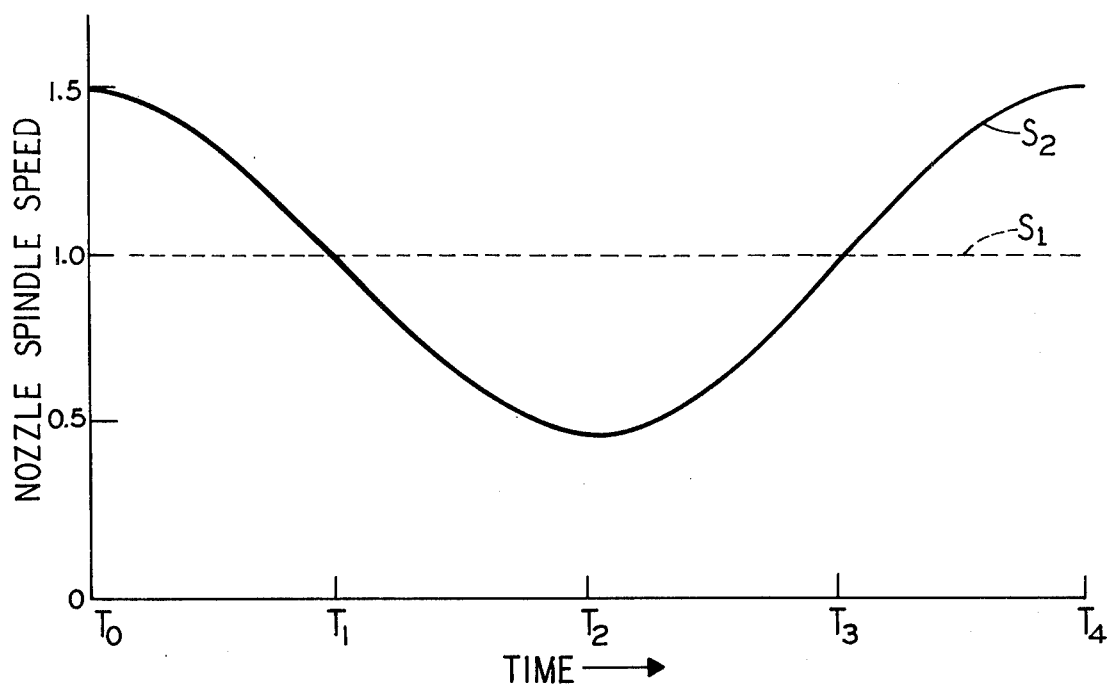
FIG. 5 is a graph illustrating the variation of nozzle spindle speed with respect to time in accordance with one example of the method of the invention.

According to a preferred embodiment of the invention, the nozzle assemblies 26a, 26b are both driven by variable speed means hereinafter more fully described which may be adjusted to have either a constant rotational speed or a constantly variable rotational speed. Such rotational speeds are depicted in FIG. 5 for a time period of $T_0$ to $T_4$ which represents one complete revolution of either nozzle assembly. At the times $T_0$ and $T_4$, the respective dispensing ends 82a, 82b are disposed above the array of blades 14 at their nearest approach to the axis 16 and, at time $T_2$, the dispensing ends are disposed at their greatest spacing from the axis 16. The dashed line of FIG. 5 represents a constant rotational speed $S_1$ and the solid line represents a rotational speed $S_2$ which varies in a substantially sinusoidal manner with respect to the mean speed $S_1$. The magnitude by which the speed $S_2$ varies from the mean speed $S_1$ is dependent upon the particular size of coil to be formed and is shown in FIG. 5 as being 50 percent of the means speed $S_1$.

Figure 6:
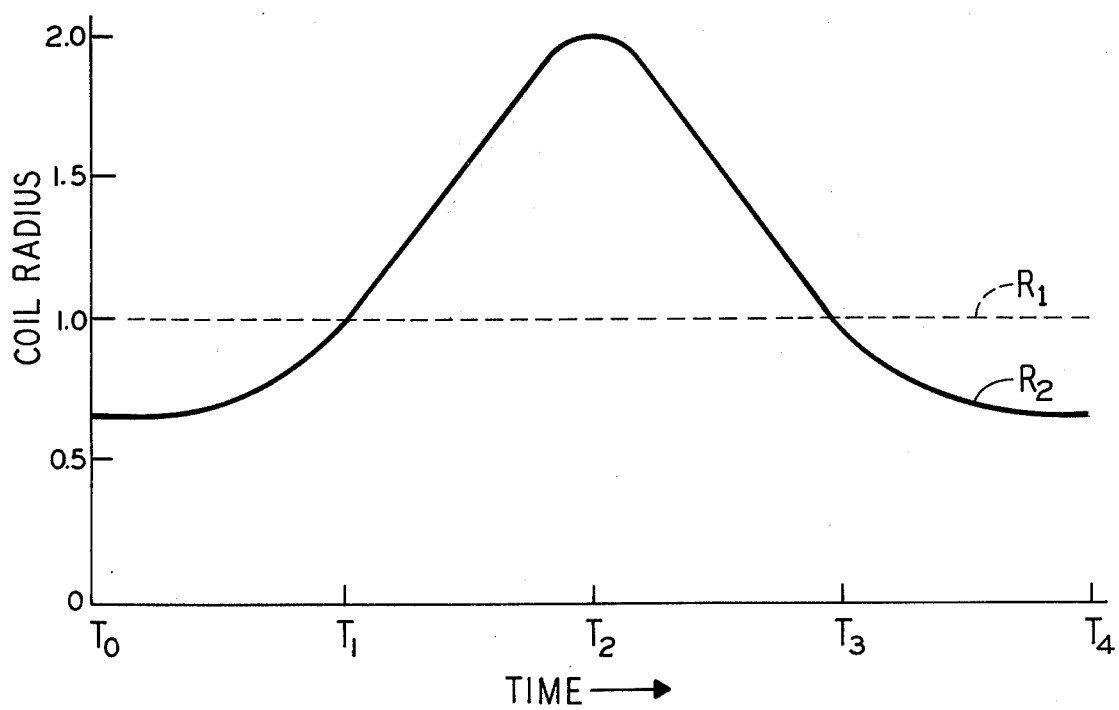
FIG. 6 is a graph illustrating the variation of coil radius with respect to time in accordance with one example of the method of the invention.

Referring now to FIG. 6, the dashed line $R_1$ represents the radius of a coil such as the coil 96 formed by rotation of the nozzle assembly 26a at a constant speed $S_1$. The solid line $R_2$ represents the varying radius of a coil formed by rotation of the nozzle assembly at the varying speed $S_2$ depicted in FIG. 5. At the time $T_0$ when the dispensing end 82a is at its nearest approach to the axis 16 and rotating at maximum speed, the radius of the coil formed by the nozzle assembly has a minimum value. The coil radius increases only slightly as the dispensing end 82a continues in its path of rotation over the array of blades 14 but thereafter increases at a substantial rate to a maximum value at time $T_2$ of approximately three times the initial value at time $T_0$. Between the times $T_2$ and $T_4$, the coil radius continuously decreases as the rotational speed of the nozzle assembly 26a increases, the rate of decrease in coil radius being relatively small as the dispensing end 82a rotates over the array of blades 14 in returning to the position occupied at time $T_0$. As a result of the constantly varying rotational speed of the nozzle assembly 28a, a coil of generally elliptical configuration is formed. One such coil indicated by a solid line at 110 in FIG. 4 has arcuate sections 112, 114, respectively, within and without the circular array of blades 14 and joined by intervening sections 116, 118 which are respectively disposed in the slots 18-1 and 18-2. It will be noted that although the length of the arcuate end turn section 112 is substantially the same as that of the end turn section 98 of circular coil 96, the section 114 without the array of blades 14 has a length many times that of the outer section 100 of the circular coil 96.

A second coil 120 of a configuration similar to the coil 110 but larger in size and passing through the slots 18-3 and 18-4 is formed by increasing radial spacing of dispensing end 82a from axis 28a, increasing the spacing between axes 16 and 28a, and increasing the rate of wire advance through the nozzle 78a. A still larger sized coil 122 passing through slots 18-5 and 18-6 may be formed by further changing the aforementioned spacings and the rate of wire advance through the nozzle assembly 78a. It will be understood that a similar set of coils 124, 126, 128 could be similarly formed at the same time by rotation of the nozzle assembly 26b and disposed in the respective pairs of slots: 18-7, 18-8; 18-9, 18-10; and 18-11, and 18-12. Preferably, the coils 124, 126, 128 are sequentially formed from a continuous length of wire 90b by the nozzle assembly 26b simultaneously as the coils 110, 120, 122 are sequentially formed from a continuous length of wire 90a by the nozzle assembly 26a. The generally concentric, serially connected coils 110, 120, 122 of different sizes comprise a first pole winding group 130 and the generally concentric, serially connected coils 124, 126, 128 of different sizes comprise a second pole winding group 132. If such winding groups are to be employed in a two pole or six pole stator, they are formed by rotating nozzle assemblies 26a, 26b in opposite directions such that the winding groups 130, 132 are oppositely wound. For use of such winding groups in a four pole stator, the nozzle assemblies 26a, 26b are rotated in the same direction to provide winding groups 130, 132 wound in the same direction.

Figure 7:
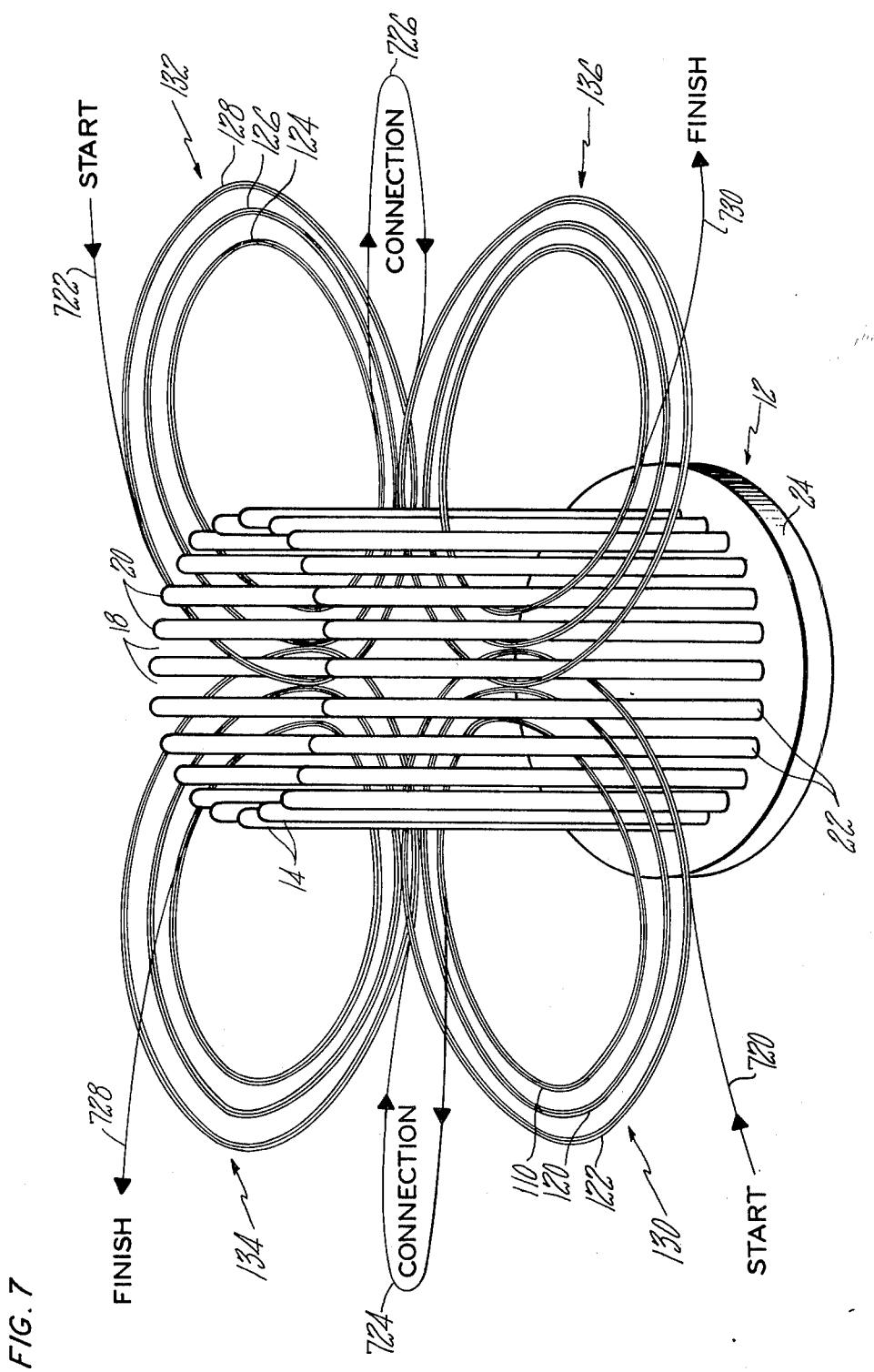
FIG. 7 is a perspective view of the blade assembly of FIG. 1 with a plurality of coils placed thereon in accordance with one example of the method of the invention.

Windings for stators having more than two poles can be readily formed by rotating the blade assembly 12 about the axis 16 to the proper position or positions to receive additional winding groups formed by the nozzle assemblies 26a, 26b. When the winding apparatus 10 is used to form four pole winding groups, for instance, the blade assembly 12 is rotated 90° after formation of the winding groups 130, 132. Without severing the wires 90a, 90b from which the respective winding groups 130, 132 were formed, two additional pole winding groups indicated at 134 and 136 in FIG. 7 are formed.

The various portions of the improved winding forming apparatus described somewhat generally above in connection with the nozzle assemblies 26a, 26b are described in greater detail in connection with FIGS. 8 through 17 to which reference is now made. The reference characters therein are the same as the reference characters used above with added ones as needed.

Figure 8:
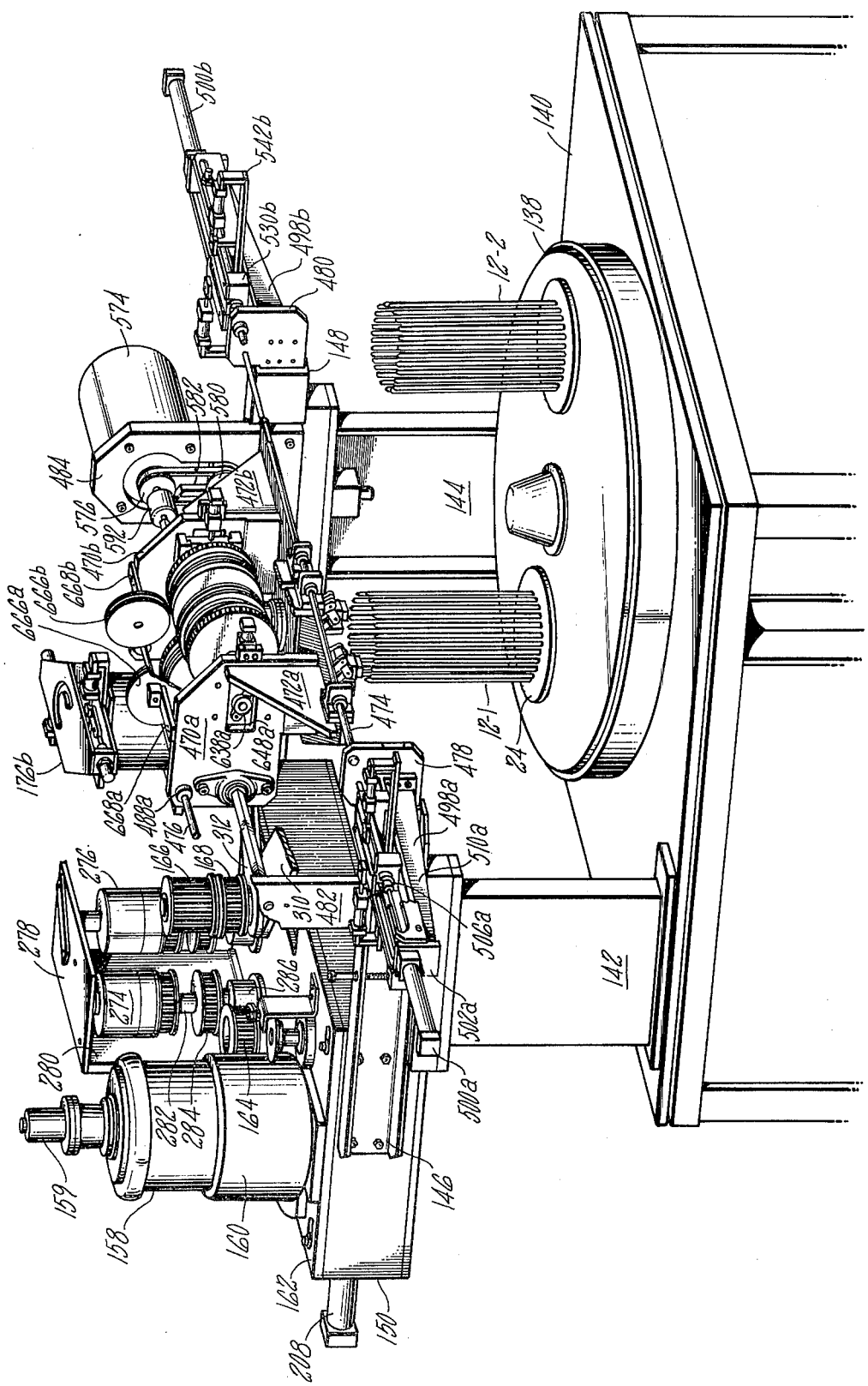
FIG. 8 is a perspective view of apparatus embodying the invention in a preferred form and which may be utilized in practice of the invention in a preferred form, with certain parts omitted.
Figure 9:
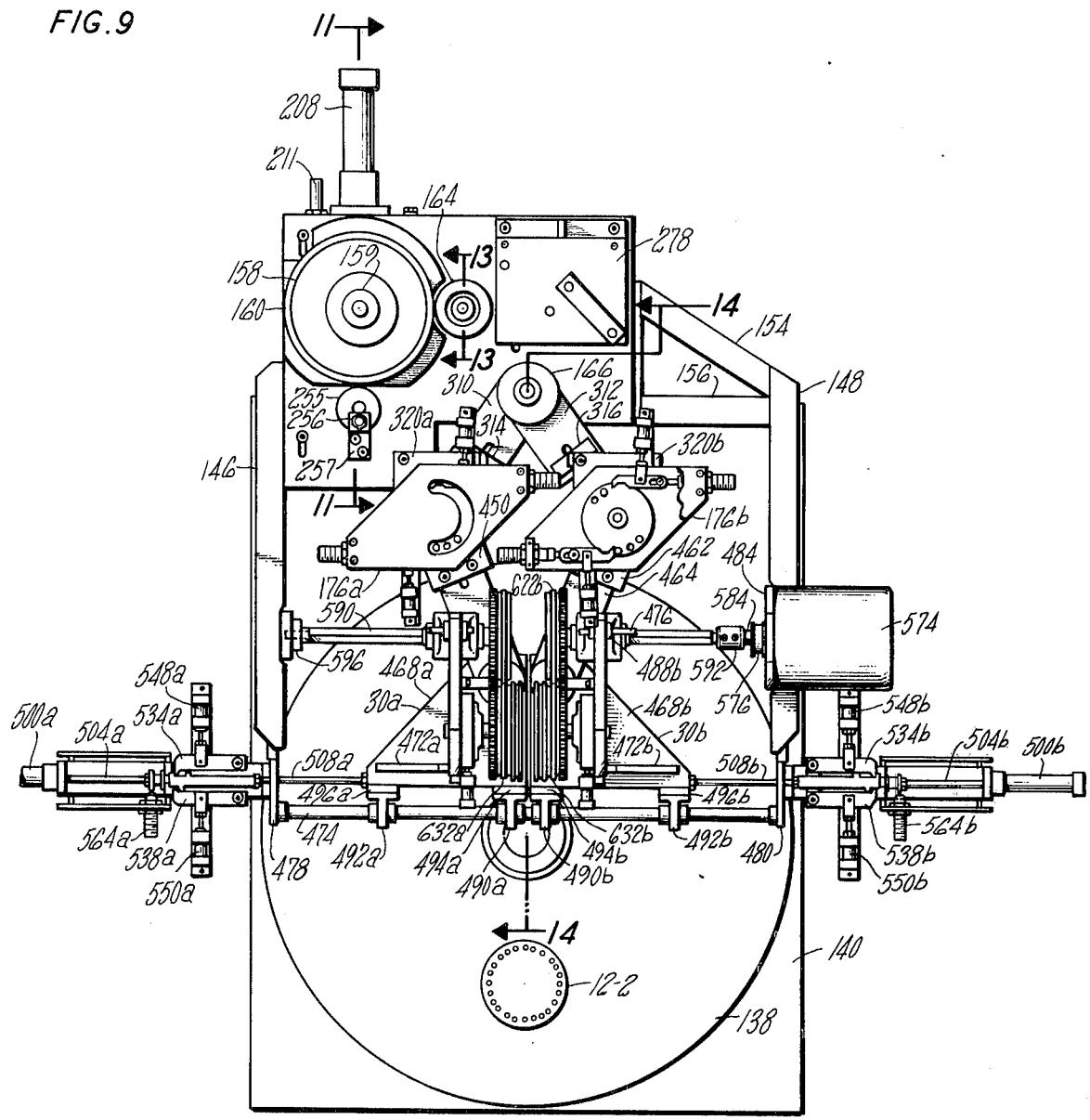
FIG. 9 is a top view of the apparatus of FIG. 8 with certain parts omitted.
Figure 10:
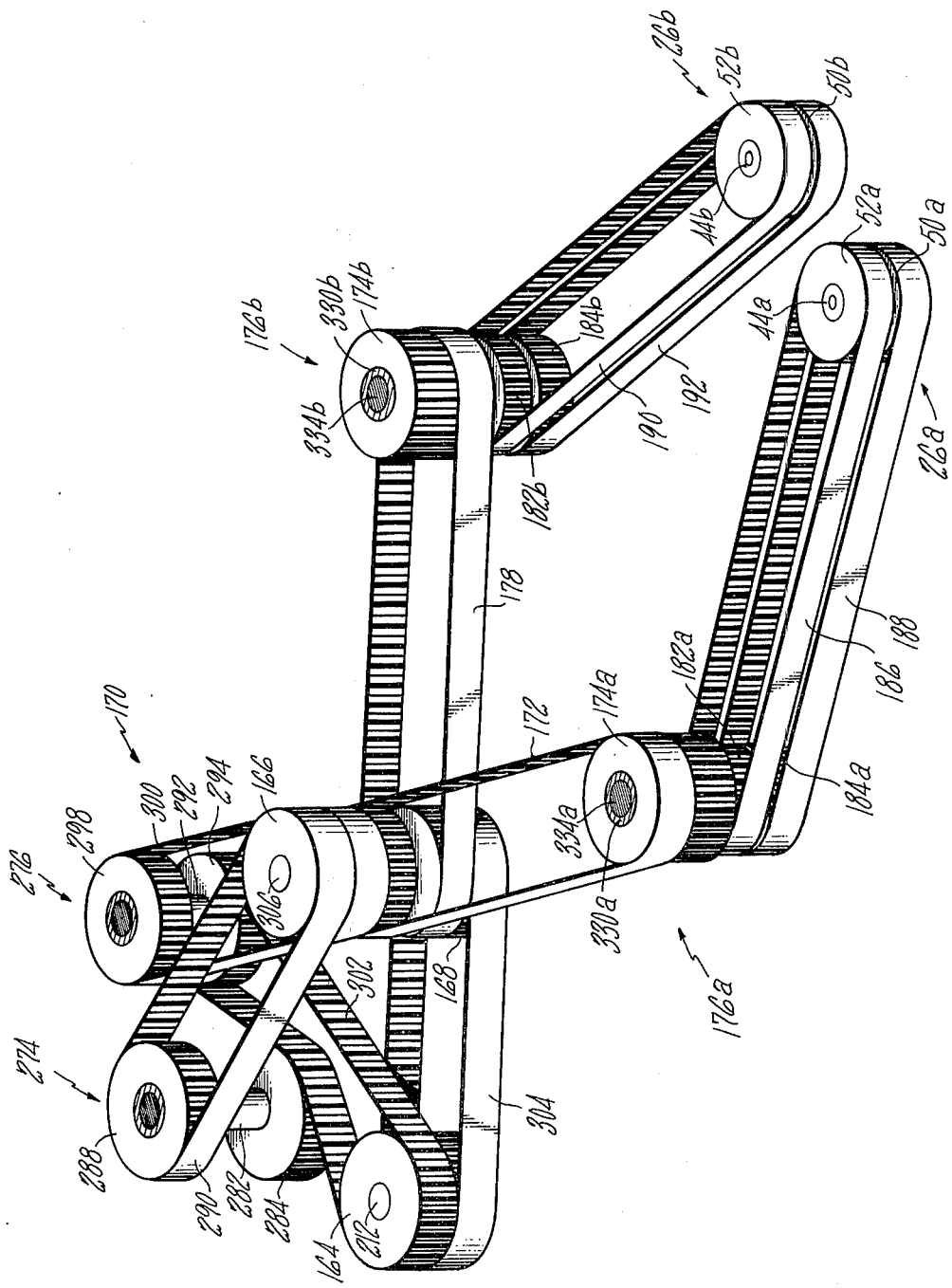
FIG. 10 is a simplified schematic perspective view of the pulley and belt system of the apparatus of FIG. 8.

Referring first to FIGS. 8–10, a pair of blade assemblies 12-1 and 12-2 are carried by a turret or index dial 138 which is mounted on a main supporting framework or table 140 for indexing rotation about a vertical axis. Blade assembly 12-1 is shown positioned at a coil forming station directly under the nozzle assemblies 26a, 26b while blade assembly 12-2 is shown positioned at a winding removal station. The blade assembly 12-1 may be rotated by conventional indexing means (not shown) to the removal station with blade assembly 12-2 simultaneously being rotated to the forming station. Each blade assembly, in addition to being rotatable with the turret 138, is rotatable (by means not shown) relative to the turret about the axis 16 when the blade assembly is positioned at the forming station.

Also mounted on the table 140 are two spaced standards 142, 144 which are secured at their respective upper ends to channel brackets 146, 148 forming a portion of the improved winding forming apparatus 10 and supporting other components of the apparatus. One end of the bracket 146 is secured to a sidewall of a hollow box-like structure providing a gear housing 150 for a motion conversion mechanism 152 while arms 154, 156 at one end of bracket 148 are secured to an opposite side wall of the gear housing 150. Driving means for the nozzle assemblies 26a, 26b including a suitable reversible dual-speed motor 158 and an air-operated clutch-brake mechanism 160 are mounted on the top plate 162 of the housing 150. An optical encoder 159 is coupled to the motor 158 to generate electrical pulses at a rate dependent upon the speed of the motor 158 for a purpose to be hereinafter described. The motor 158 is operatively connected by the clutch-brake mechanism 160 to the motion conversion mechanism 152 so as to transmit driving force to a main drive pulley 164. The pulley 164, in turn, transmits driving forces to a pair of idler pulleys 166, 168 which together with the pulley 164 comprise part of a pulley system 170 supported on the plate 162. The upper idler pulley is operatively connected by a gearbelt 172 to the input pulley 174a of a differential assembly 176a (omitted from FIG. 8) and the lower idler pulley 168 is operatively connected by a gearbelt 178 to the input pulley 174b of a second differential assembly 176b. The differential assemblies 176a, 176b have respective pairs of output pulleys 182a, 184a and 182b, 184b which are coupled to the respective gearbelts 172, 178 so that the two output pulleys of each differential assembly are driven in unison at the same speed. Each differential assembly, however, permits a controlled variation of the relative angular relation of its two output pulleys in operation of the winding forming apparatus. The output pulleys 182a, 184a are operatively connected to the respective pulleys 52a, 56a of the nozzle assembly 26a by a pair of gearbelts 186, 188 while the output pulleys 182b, 184b are operatively connected to the respective pulleys 52b, 56b of the nozzle assembly 26b by a pair of gearbelts 190, 192.

Figure 11:
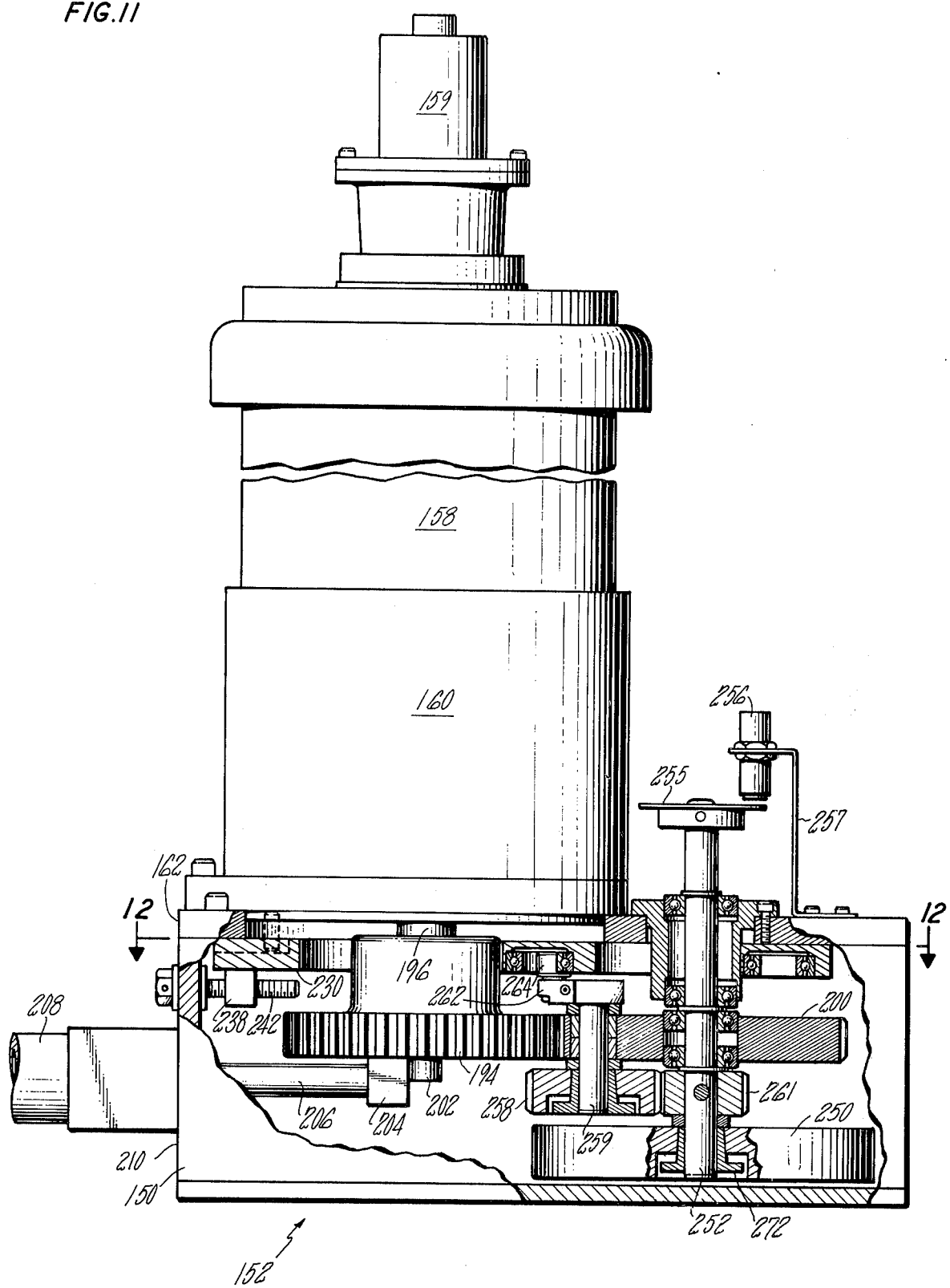
FIG. 11 is a side cross-sectional view taken generally along the line 11—11 of FIG. 9.

Referring more particularly to FIGS. 11 through 13, the motion conversion mechanism 152 is shown as including a main drive gear 194 secured to the output shaft 196 of the clutch-brake mechanism 160 and meshing with two gears 198, 200. Two cam rollers 202 are attached to the lower side of the drive gear 194 at diametrically opposite locations for engagement by an indexing block 204 affixed to the piston rod 206 of a double acting air cylinder 208 which is mounted on the end wall 210 of the housing 150. The indexing block 204 is in a retracted position during operation of the motion conversion mechanism 152 but is extended into engagement with the cam rollers 202 to center the drive gear 194 in either of two indexed positions. A sensing device 211 such as a R.F. pickup device is mounted on the end wall 210 to provide control signals when the indexing block 204 is in its retracted and extended positions.

The gear 198 is journaled by suitable bearings for rotation on a lower portion of a shaft 212 which in turn is rotatably supported in an opening of plate 162 by means of suitable bearings. A gear 216 is fixed to the lower end of the shaft 212 in meshing engagement with a gear 218 fixed to a shaft 220 which is rotatably supported in an opening of gear 194. The upper end of shaft 220 projecting above the gear 194 is affixed to one end of an arm or lever 224. A cam roller or follower 226 is attached to the other end of arm 224 and is received in the cam recess 228 of a cam plate 230. The cam plate 230 is slidably supported on the lower side of top plate 162 by suitable means such as bolts 232 which pass through appropriate slotted openings in the plate 162. The cam plate 230 is also provided with a pair of aligned guide slots 234 in its upper surface which receive dowel pins 236 fixed to the plate 162 to guide the cam plate 230 for longitudinal movement toward and away from the end wall 210. A block 238 fastened to the lower side of the cam plate 230 has a threaded opening therethrough receiving a threaded rod 242 which is rotatably supported in an opening 244 of the housing end wall 210 for adjustably moving the cam plate 230. This enables selective adjustment of the cam plate 230 between a position where the cam recess 228 is concentrically disposed with respect to the gear 198 as shown by dashed lines in FIG. 12 and positions of different degrees of eccentricity.

For the condition when gear 198 is rotated in a clockwise direction as viewed from the upper end of shaft 212, the gear 198 carries the gear 218 in a clockwise direction about the shaft 212 thereby driving the gear 216 in a clockwise direction. The resulting torque applied to the shaft 220 causes an angular pivotal movement of the arm 224 in a counterclockwise direction about the axis of shaft 220 to maintain the cam roller 226 in engagement with the outer peripheral cam surface 246 of the cam recess 228. Upon counterclockwise rotation of the gear 198, the gear 216 is driven in a counterclockwise direction as the cam roller 226 rides upon the inner peripheral cam surface 248 of the cam recess 228. When the cam recess 228 is concentrically disposed with respect to the gear 198, it will be seen that the angular displacement of the arm 224 relative to the axis of the shaft 220 remains constant throughout each revolution of the gear 198 with the result that the gear 216 is driven at the same speed as that of gear 198. If, however, the cam recess 228 is eccentrically disposed with respect to the gear 198, the angular displacement of the arm 224 relative to the axis of the shaft 220 will alternately increase and decrease during each revolution of the gear 198. The corresponding changes in the angular position of the gear 218 results in the gear 216 being driven at alternately increasing and decreasing rotational speeds during each revolution in the manner depicted by the curve $S_2$ of FIG. 5.

The main drive pulley 164 is fixed to the upper end of the shaft 212 and accordingly may be driven at either a constant rotational speed or a constantly variable rotational speed to rotatably drive the nozzle assemblies 26a, 26b in a desired manner. It will be appreciated that the rotating parts of the nozzle assemblies together with the rotating parts of the pulley system 170 and the differential assemblies 176a, 176b constitute a rotating mass of substantial magnitude which develops a substantial inertia effect when driven at constantly varying speeds. To balance out this effect, the gear 200 is drivingly connected to a flywheel 250 so as to rotate the flywheel at the same mean speed as that of the main drive pulley 164 but with speed variations directly opposite those of the main drive pulley. Like the gear 198, the gear 200 is journaled by suitable bearings for rotation on a shaft 252 which in turn is rotatably supported in an opening of plate 162 by means of suitable bearings. A counting wheel 255 is mounted on the upper end of shaft 252 and cooperates with a photoelectric pickup 256 mounted on a bracket 257 which, in turn, is secured to the plate 162. A gear 261 is fixed to the lower end of shaft 252 in meshing engagement with a gear 258 fixed to a shaft 259 which is rotatably supported in an opening of the gear 200. The upper end of the shaft 259 is affixed to one end of an arm or lever 262 and a cam roller or follower 264 is attached to the other end of the arm 262. The cam plate 230 is formed with a second cam recess 266 which has respective outer and inner peripheral cam surfaces 268, 270 selectively engageable by the cam roller 264, depending upon the direction in which the gear 200 rotates. The flywheel 250 is secured to the lower end of the shaft 252 by a suitable lock bushing 272. The cam recess 266 is concentrically disposed with respect to the gear 200 when cam recess 228 is concentrically disposed with respect to the gear 198, and its eccentric disposition with respect to the gear 200 changes to the same degree as that of cam recess 228 and gear 198 when the cam plate 230 is shifted. From the foregoing, it can be seen that the driving mechanism of the flywheel 250 corresponds closely to that of the main drive pulley 164 and functions in a similar manner. However, the gears 198, 200 are meshed with the main drive gear 194 in a manner such that the axes of the shafts 220, 259 are disposed on diametrically opposite sides of the respective gears 198, 200, thus being rotated 180° out of phase. As a result, the rotational speed of the flywheel 250 successively increases as the rotational speed of the main drive pulley 164 successively decreases and, conversely, successively decreases as the rotational speed of the main drive pulley 164 successively increases. Thus, the inertia effect of the flywheel acts in opposition to the inertia effect of the nozzle assemblies 26a, 26b and their driving apparatus.

Referring now more particularly to FIGS. 8, 9, 10, and 14, the pulley system 170 is shown as further including two clutches 274, 276 attached to a support plate 278 mounted cantilever fashion on an upstanding plate member 280 which, in turn, is mounted on the top plate 162. The input of the reverse drive clutch 274 is a shaft 282 to which a drive pulley 284 is mechanically connected, the lower end of the shaft 282 being journalled in a bearing sleeve 286 secured to the top plate 162. The output of the clutch 274 is a pulley 288 about which extends a gearbelt 290, the other end of which extends around the upper portion of the upper idler pulley 166. The input of the forward clutch 276 is a shaft 292 to which a drive pulley 294 is mechanically connected, the lower end of the shaft 292 being journalled in a bearing sleeve 296 secured to the top plate 162. The output of the clutch 276 is a pulley 298 about which extends a gearbelt 300, the other end of which extends around an intermediate portion of the upper idler pulley 166. A gearbelt 302 toothed on both sides extends about the upper portion of the main drive pulley 164, against the input pulley 284 of the reverse clutch 274, and about the input pulley 294 of the forward clutch 276. The lower portion of the main drive pulley 164 and the lower portion of the lower idler pulley 168 are joined by another gearbelt 304. The gearbelt 304 as well as the other aforementioned gearbelts are toothed timing belts and the respective pulleys with which they are engaged are each toothed with a series of transverse rectangular slots receiving the belt teeth. This arrangement causes all pulleys being driven from the main drive pulley 164 to rotate once with each rotation of the pulley 164. The clutches 274, 276 are each of a well-known air-operated, single-position type and are arranged such that when the respective clutches are deactuated the output pulleys are stopped at identical predetermined angular positions corresponding to the angular position of the main drive pulley 164 effected by centering of the drive gear 194 to a selected one of its indexed positions.

Assuming the forward clutch 276 to be actuated and the reverse clutch 274 to be deactuated, the upper idler pulley 166 and the lower idler pulley 168 are synchronously rotated in the same direction and in phase with the main drive pulley 164. When the reverse clutch 274 is actuated and the forward clutch 276 is deactuated, the pulleys 166, 168 are synchronously rotated in opposite directions and in phase with the main drive pulley 164. Thus, it will be seen that this arrangement of the pulley system 170 provides for rotation of the nozzle assemblies 26a, 26b in either the same or opposite directions.

The idler pulleys 166, 168 are mounted for rotation on a shaft 306 which has its lower end fixed within the bore of a retainer ring 308 which, in turn, is secured to the top plate 162. Two link plates 310, 312 are each pivotally mounted at one end on the retainer ring 306 and have respective slotted opposite ends to which riser plates 314, 316 are adjustably secured by suitable bolts 318. The differential assemblies 176a, 176b, respectively, are mounted upon the riser plates 314, 316, the cap plate 320a of differential assembly 176a being secured to the riser plate 314 by suitable bolts 322 and the cap plate 302b of differential assembly 176b likewise being secured to the riser plate 316 by suitable bolts 322.

Figure 17:
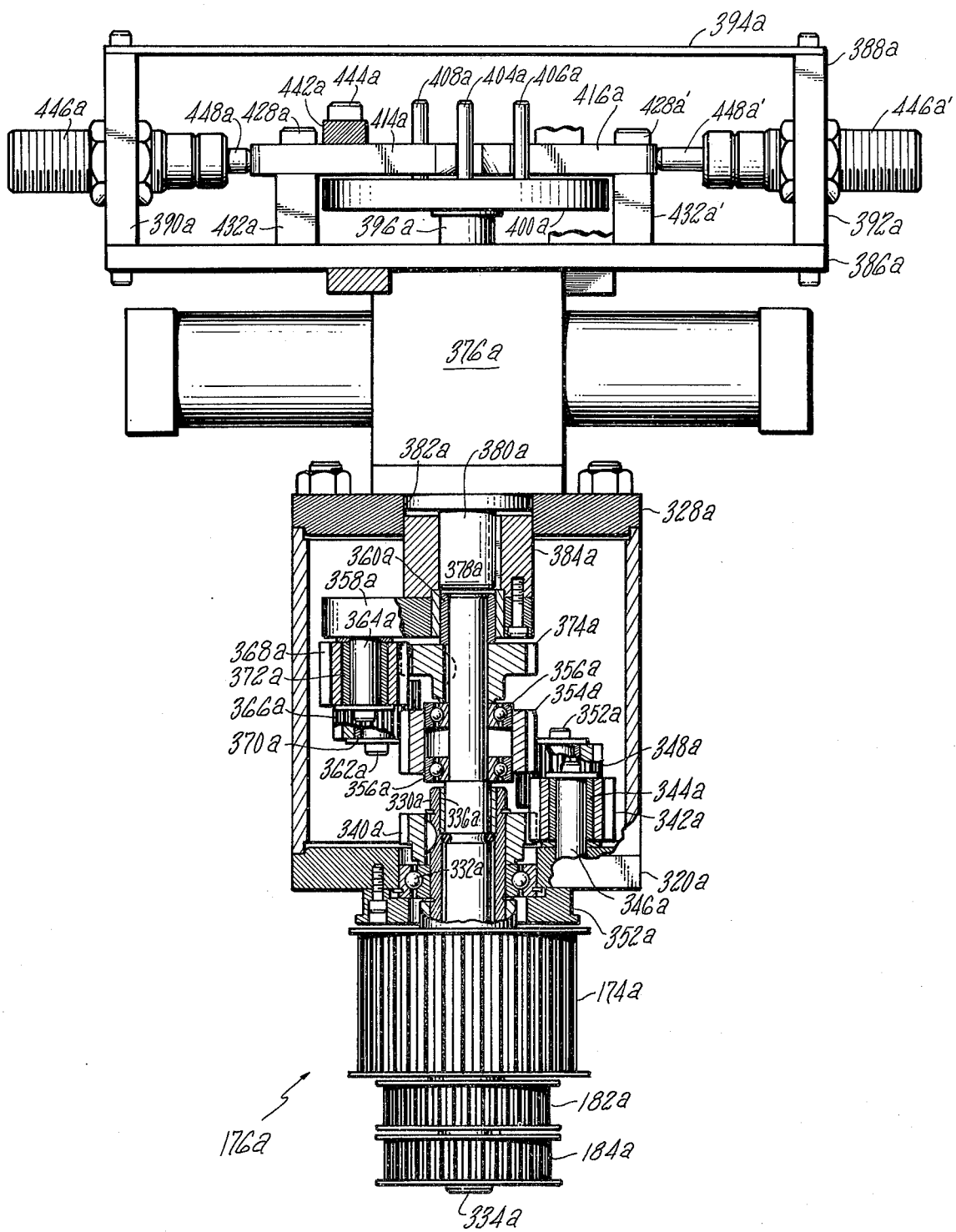
FIG. 17 is a side elevational view, with parts broken away and parts in section of one differential assembly of the apparatus of FIG. 8.

The differential assemblies 176a, 176b are identical and thus a description of assembly 176a will suffice. As shown in FIG. 17, the differential assembly 176a includes a housing comprising a tubular casing 326a closed at its lower end by the cap plate 320a and at its upper end by another cap plate 328a. The input pulley 174a and the output pulley 182a are each keyed to the lower end of an outer tubular shaft 330a which is rotatably supported in cap plate 320a by a bearing 332a. The output pulley 184a is keyed to the end of an inner shaft 334a which is rotatably supported within the shaft 330a by suitable bearings including the bearing 336a. Attached to the upper end of the outer shaft 330a for rotation therewith is a driving gear 340a which meshes with the lower portion of a gear 342a. The gear 342a is journalled by a suitable bearing 344a on a stub shaft 346a secured to lower cap plate 320a for rotation of the gear 342a about an axis parallel to the axis of shafts 330a, 334a. The upper portion of gear 342a meshes with the lower portion of a gear 348a likewise journalled for rotation on a stub shaft 352a which extends parallel to the shaft 346a and is also secured to the cap plate 320a. The upper portion of gear 348a meshes with an idler gear 354a which is rotatably supported on the inner shaft 334a by bearings 356a for rotation about the axis of shaft 334a.

A gear carrier arm 358a is pivotally mounted on the upper end of inner shaft 334a by a suitable bearing 360a and has affixed thereto stub shafts 362a, 364a which each extend parallel to the shaft 334a. Gears 366a, 368a are rotatably supported on the stub shafts 362a, 364a, respectively, by suitable bearings 370a, 372a. The gear 366a has a lower portion in meshing engagement with the idler gear 354a and an upper portion in meshing engagement with the lower portion of the gear 368a. The latter gear, in turn, meshes with an output gear 374a which is keyed to the inner shaft 334a. The gears of the differential assembly 176a may be conventional spur gears all having the same diametrical pitch and the same pitch diameter. It will be evident that the inner shaft 334a will be driven at the same speed and in the same direction as the outer shaft 330a is driven by its input pulley 174a. The output pulleys 182a and 184a will therefore rotate in unison at the same rotational speed. However, the angular relationship of the pulleys 182a, 184a may be altered by angularly pivoting the gear carrier arm 358a about the axis of the inner shaft 334a. When the arm 358a is pivotally moved through a particular angle in one direction or the other about the axis of shaft 334a, the swinging motion of the gears 366a, 368a together with the resulting rotational motion of these gears effects an angular rotation of the inner shaft 334a relative to the outer shaft 330a twice the particular angular motion of the arm 358a.

The gear carrier arm 358a is pivotally moved about the axis of shaft 334a by the mechanism now to be described in connection with FIGS. 17 and 18. A conventional air-operated rotary actuator 376a is secured to the upper surface of the cap plate 328a and has one end 378a of its drive shaft 380a extending downwardly through an opening 382a formed in the cap plate 328a. The lower end 378a of the drive shaft 380a is operatively connected to the gear carrier arm 358a by means shown in FIG. 17 as a sleeve 384a but which preferably comprises reduction gearing (not shown) that effects a reduced angular rotation of the gear carrier arm 358a as compared to the angular rotation of the drive shaft 380a. The bottom frame member 386a of an index frame assembly 388a is secured to the upper surface of the actuator 376a. Side frame members 390a, 392a are respectively secured to the frame member 386a and extend upwardly therefrom in spaced-apart relation. A top frame member 394a extends across and is secured to the upper extremities of the side frame members 390a, 392a. The upper end 396a of drive shaft 380a extends upwardly through an opening formed in the bottom frame member 384a. A disc-like index plate 400a is keyed to the end 396a of the drive shaft 380a. A plurality of small recesses or apertures 402a are formed in the upper surface of the index plate 400a adjacent the periphery thereof and arranged along an imaginary circle concentric with the center of the index plate 400a. Three metal dowel pins 404a, 406a, 408a are press-fitted into selected recesses 402a and extend upwardly from the index plate 400a. The pins 404a, 406a are disposed for selective engagement with a stop pawl 414a while the pin 408a is disposed for selective engagement with another stop pawl 416a.

The pawl 414a includes a body portion 422a with substantially parallel opposed sides one of which terminates in a notched surface 424a adjacent a pin-abutting end portion 426a. A shoulder screw 428a projects through a longitudinally extending slot 403a formed in the pawl body portion 422a into a spacer 432a and is affixed to the bottom frame member 386a to mount the pawl 414a for both pivotal movement and translational sliding movement. A double-acting air cylinder 434a pivoted at 436a on a bracket member 438a extending laterally outwardly from the side of bottom frame member 386a has a piston rod 404a connected to a clevis 442a which, in turn, is pivotally connected to the pawl 414a by a shoulder screw 444a. A conventional shock absorber 446a mounted on the side frame member 390a has an outwardly extending piston rod 448a which applies a biasing force to the end of the pawl 414a opposite the end portion 426a. The stop pawl 416a is identical to the pawl 414a and is operatively mounted in a reversed position on the bottom frame member 386a in a like arrangement in which like elements are indicated by corresponding primed reference characters.

In operation, the rotary actuator 376a is selectively actuated by conventional valve means to rotate its drive shaft 380a in opposite directions. Initially the actuator 376a is actuated in a forward direction to rotate the index plate 400a to a position where the pin 404a is in engagement with the end portion 426a of the pawl 414a. The torque applied to the index plate 400a biases the pawl 414a longitudinally toward the shock absorber 446a to an extreme rearward position determined by engagement of the screw 428a with one end of the slot 430a. As a result, the gear carrier arm 358a is positively located at the particular angular position required for winding the largest coil 122 shown in FIG. 4. When the coil 122 has been wound with the desired number of turns, cylinder 434a is actuated to pivot the pawl 414a away from the pin 404a thereby permitting the index plate 400a to be rotated in a clockwise direction as viewed in FIG. 18. The pawl 416a which had been biased to an extreme forward position by the shock absorber 446a' is engaged by the pin 408a and is driven at a controlled rate to its extreme rearward position. This indexing movement of the index plate 400a shifts the gear carrier arm 358to a second angular position for winding of the intermediate sized coil 120 shown in FIG. 4. Upon completion of this indexing motion, the actuation of cylinder 434a is reversed to retract the pawl 414a which then assumes an extreme forward position under the bias of the shock absorber 446a. The pin 404a now located adjacent the notched surface 424a of the pawl 414a is free from any interfering relationship with the pawl 414a.

When the coil 120 has been wound with the desired number of turns, cylinder 434a' is actuated to pivot the pawl 416a away from the pin 408a thereby permitting the index plate 400a to be further rotated in a clockwise direction until the pin 406a engages the pawl 414a and drives the pawl 414a to its extreme rearward position. This second incremental angular rotation of the index plate 400a shifts the gear carrier arm 358a to a third angular position for winding of the smallest coil 110 shown in FIG. 4. After winding of the coil 110 is completed, the rotary actuator 376a is actuated in a reverse direction for return movement of the index plate 400a to its initial position where it may again be sequentially advanced to second and third indexed positions. It will be observed that the notched surfaces 424a, 424a' of the respective pawls 414a, 416a permit return movement of the index plate 400a without actuating the cylinders 434a, 434a'.

As noted above, the differential assembly 176a is supported by a riser plate 314 and link plate 310 for pivotal movement about the axis of the idler pulleys 166, 168, and the differential assembly 176b is likewise supported for pivotal movement about the axis of the idler pulleys 166, 168. The differential assemblies 176a, 176b are also supported for pivotal movement about the respective axes 28a, 28b of the nozzle assemblies 26a, 26b. For this purpose, a link plate 450 is pivotally mounted at one end on a retainer ring 452a which is secured to the lower cap plate 320a of the differential assembly 176a. The upper end of a riser plate 454 is secured to the opposite end of the link plate 450 and its lower end is adjustably secured by suitable bolts 456 to the slotted end of another link plate 458. The opposite end of the link plate 458 in turn is pivotally mounted on a retainer ring 460a disposed about the upper bearing 40a of the nozzle assembly 26a and abutting the upper surface of the mounting plate 30a. The differential assembly 176b is likewise supported by link plates 462, 464 secured at their respective adjacent ends to a similar riser (not shown). Thus each differential assembly 176a, 176b is supported by linkage which permits lateral movements of the respective nozzle assemblies 26a, 26b without changing the spacing between the axis of each differential assembly and the axis of the idler pulleys 166, 168 or changing the spacing between the axis of each differential assembly and the respective axis 28a or 28b of the nozzle assemblies. The link plates 310, 312, 458, 464 being slotted at one end permit the tension of the respective gearbelts to be conveniently adjusted.

Referring now to FIGS. 8, 9 and 14, the mounting plate 30a of the nozzle assembly 26a is shown as comprising the base of a carriage member 468a and the mounting plate 30b of the nozzle assembly 26b is shown as comprising the base of a carriage member 468b. The carriage members 468a, 468b are identical with the exception that the carriage member 468a is lefthanded and the carriage member 468b is righthanded. Carriage member 468a includes an upright plate 470a welded to the mounting plate 30a and braced by a buttress plate 472a which is welded to the plates 30a and 470a. The carriage members 468a, 468b are slideably mounted upon a pair of parallel carriage rails or guide rods 474, 476. The rail 474 extends between and is secured to upstanding legs 478, 480 at the respective distal ends of the channel brackets 146, 148. The rail 476 extends between and is secured to the upper ends of two upright brackets 482, 484, the bracket 482 being attached to the channel bracket 146 rearwardly of the leg 478 and the bracket 484 being attached to the channel bracket 148 rearwardly of the leg 480. The upright plates 470a, 470b of the carriage members have respective apertures adjacent their upper rearward corners with respective linear bearings 488a, 488b disposed therein to receive the rail 476 for free sliding movement of the carriage members back and forth on the rail 476. Pillow blocks 490a, 492a are secured, respectively, to a vertical wire guide bracket 494a and a spacer block 496a carried by the forward edge of the mounting plate 30a. Pillow blocks 490a, 492a together with pillow blocks 490b, 492b which are similarly attached to the mounting plate 30b receive the rail 474 to also support the carriage members 468a, 468b for free sliding movement on the rail 474.

By means now to be described, the carriage member 468a is laterally shifted on the rails 474, 476 in sequential steps for selectively changing the spacing between the axis 28a of the nozzle assembly 26a and the central axis 16 of the blade assembly 12. These means are shown in FIGS. 8, 9 and 19 as including a bracket 498a supported in cantilever fashion from the leg 478 of channel bracket 146. A double-acting air cylinder 500a is attached to an upstanding arm 502a at the distal end of bracket 498a and has its piston rod 504a attached to one end of a plunger 506a. The opposite end of the plunger 506a is threaded to receive one end of a threaded rod 508a which has its other end fastened to the mounting plate 30a. A guide block 510a mounted on the bracket 498a is provided with a suitable aperture in which a linear bearing 518a is disposed to receive the plunger 506a for sliding axial movement therethrough. The plunger 506a is of a generally cylindrical form with an upper flat surface 520a upon which is mounted a longitudinally extending detent bar 522a. The detent bar 522a is formed with three longitudinally spaced abutments 524a, 526a, 528a, the abutments 524a and 528a being disposed in spaced-apart relationship on one side of the detent bar 522a, the other abutment 526a being disposed on the other side of the detent bar at a location intermediate the abutments 524a and 528a. Also fastened to the bracket 498a is a saddle-like mounting block 530a having a deep groove in its upper portion through which the plunger 506a and the detent bar 522a freely pass. A latch 534a is pivotally mounted on block 530a at one side of the detent bar 522a, as at 536a, and another latch 538a is pivotally mounted on block 530a at the other side of the detent bar 522a, as at 540a. A U-shaped bracket 542a secured to the bracket 498a in transverse relation thereto has upstanding legs 544a, 546a on which respective double-acting air cylinders 548a, 550a are pivotally connected. The cylinder 548a has its piston rod 552a connected to a clevis 554a which in turn is pivotally connected to the latch 534a by a shoulder screw 556a. The cylinder 550a likewise has its piston rod 558a connected to a clevis 560a which in turn is pivotally connected to the latch 538a.

In operation, the piston rod 504a of the cylinder 500a is initially retracted to move the detent bar 522a together with the carriage member 468a and the nozzle assembly 26a in a reverse direction away from the axis 16 of the blade assembly 12. The actuation of the cylinder 500a is then reversed to apply a biasing force on the detent bar 522a in the forward direction, forward movement of the detent bar however being restrained by engagement of latch 534a with abutment 528a. As a result, the nozzle assembly 26a is supported by the carriage member 468a in the exact location required for winding of the largest coil 122 shown in FIG. 4. When the coil 122 has been wound with the desired number of turns, cylinder 548a is actuated to pivot the latch 534a away from the abutment 528a thereby permitting the cylinder 500a to move the detent bar 522a together with the carriage member 468a and the nozzle assembly 26a in a forward direction. However, the extent of this forward movement is only the incremental distance between abutment 528a and abutment 526a since the latter abutment engages the latch 538a thereby positioning the nozzle assembly 26a for winding of the intermediate sized coil 120 shown in FIG. 4. When the coil 120 has been wound with the desired number of turns, cylinder 550a is actuated to pivot the latch 538a away from the abutment 526a thereby permitting the cylinder 500a to move the detent bar 522a an additional incremental distance in the forward direction until the latch 534a engages the abutment 524a. As a result, the nozzle assembly 26a is shifted to the exact location required for winding of the smallest coil 110 shown in FIG. 4. It will be seen that the latches 534a, 538a are provided with beveled edges rearwardly of the abutment engaging end portions thereby permitting cylinder 500a to retract detent bar 522a to its initial position without actuating the cylinders 548a, 550a.

A sensing device 564a such as an R.F. pickup is adjustably mounted on one of the brackets 568a, 570a secured to opposite sides of the bracket 498a. This sensing device provides a control signal when a collar 572a mounted on the piston rod 504a of cylinder 500a moves into proximity thereto at the extreme reverse position of the detent bar 522a.

The wire pushing means represented by the pairs of rollers 92a, 94a and 92b, 94b in FIG. 1 will now be described in detail in connection with FIGS. 8, 9, 14, 15 and 16. A variable speed servomotor 574 mounted upon the upright bracket 484 has a toothed pulley 576 affixed to its output shaft for driving another toothed pulley 580 of equal diameter through a gearbelt 582. The pulley 580 is keyed to a shaft 584 which is rotatably supported by a pillow block (not shown) affixed to the upright bracket 484. One end of the shaft 584 is coupled to an optical encoder 589 (FIG. 20) also secured to bracket 484, and the opposite end of the shaft 584 is drivingly connected to the adjacent end of a square drive shaft 590 by a suitable coupling 592. The optical encoder 589 is employed to generate electrical pulses at a rate dependent upon the speed of the servomotor 574 for a purpose to be hereinafter described. The drive shaft 590 extends through respective openings 594a, 594b in the upright plates 470a, 470b of the carriage members in parallel relationship with the rails 474, 476 and has its opposite end rotatably supported by a pillow block 596 affixed to the upright bracket 482. Bearing blocks 598a secured to opposite sides of the upright plate 470a at the opening 594a rotatably support a tubular shaft 602a which has an outwardly extending end portion 604a directed toward the outwardly extending end 604b of a corresponding tubular shaft 602b rotatably supported by bearing blocks 598b, 600b secured to the upright plate 470b. The shafts 602a, 602b are concentrically disposed about respective sleeves 606a, 606b which each have a square opening therethrough receiving the drive shaft 590. The sleeve 606a is pinned or otherwise drivingly connected to the shaft 602a and the sleeve 606b is similar connected to the shaft 602b. Thus the shafts 602a, 602b may be rotated by the drive shaft 590 when longitudinally shifted back and forth on the drive shaft 590 as the respective carriage members 468a, 468b are slidably moved on the rails 474, 476.

The remaining elements of the wire pushing means associated with the carriage member 468a and the nozzle assembly 26a will now be described, it being understood that the corresponding elements associated with the carriage member 468a and the nozzle assembly 26b are identified in the drawings by like reference numerals with the suffix b instead of the suffix a. A wire feed wheel 610a is secured by a suitable lock bushing 612a to the end portion 604a of the tubular drive shaft 602a for rotation by the drive shaft 602a. A gear 614a and a retaining ring 616a are secured to opposite sides of the wheel 610a by threaded fasteners 618a. The peripheral edges of the wheel 610a and the ring 616a are chamfered to define a groove 620a receiving and clamping a band 622a of resilient material which may be an inverted polyurethane V-belt. The gear 614a meshes with another gear 624a, the gear 624a and an annular capstan 626a being secured to opposite sides of a wire feed wheel 628a by threaded fasteners 630a. A resilient band 632a clamped to the wheel 628a by the capstan 626a is in tangential engagement with the band 622a along a vertical line coextensive with the axis 28a of the nozzle assembly 26a.

The wheel 628a is secured by a suitable lock bushing 634a to one end of a shaft 636a which has its opposite end rotatably supported by a pair of bearing blocks 638a secured to opposite sides of a slide 642a. The slide 642a is slidably mounted on one side of the upright plate 470 of the carriage member 468a by a pair of gibs 644a with one bearing block 638a projecting into an elongated opening 648a in the upright plate 470a. The slider 642 has a T-slot 650a in its forward end in which the piston rod 652a of a double-acting air cylinder 654a is secured by lock nuts 656a. The air cylinder 654a is secured to the forward edge of the upright plate 470a and is operative to shift the shaft 636a between a position where the band 632a of wire feed wheel 628a is in engagement with the band 622a of wire feed wheel 610a and a forward disengaged position. It will be seen that when the bands 622a, 632a are engaged, gears 614a, 624a are in mesh thereby positively driving the wire feed wheel 628a while the wire feed wheel 610a is driven by the servomotor 574.

The wire guide bracket 494a has an aperture 660a near its upper end in which is mounted a guide bushing 662a for directing wire 90a from a supply source (not shown) to an uppermost point of the capstan 626a. A guide sheave 664a is mounted for rotation about its axis by a shoulder screw 666a affixed to a bracket 668a which is secured to the upper edge of the upright plate 470a. The sheave 664a is angularly arranged with respect to the shaft 636a to receive the wire 90a after it passes around the capstan 626a and to direct the wire 90a in a generally vertical line to the point of contact between the bands 622a and 632a. A L-shaped bracket 670a attached to one side of the upright plate 470a supports a tubular guide 672a immediately below the engaged portions of the bands 622a, 632a. The guide 672a has a conical lower end 674a extending into the upper end 88a of the flexible tube 84a fixed in the nozzle assembly 26a.

Figure 20:
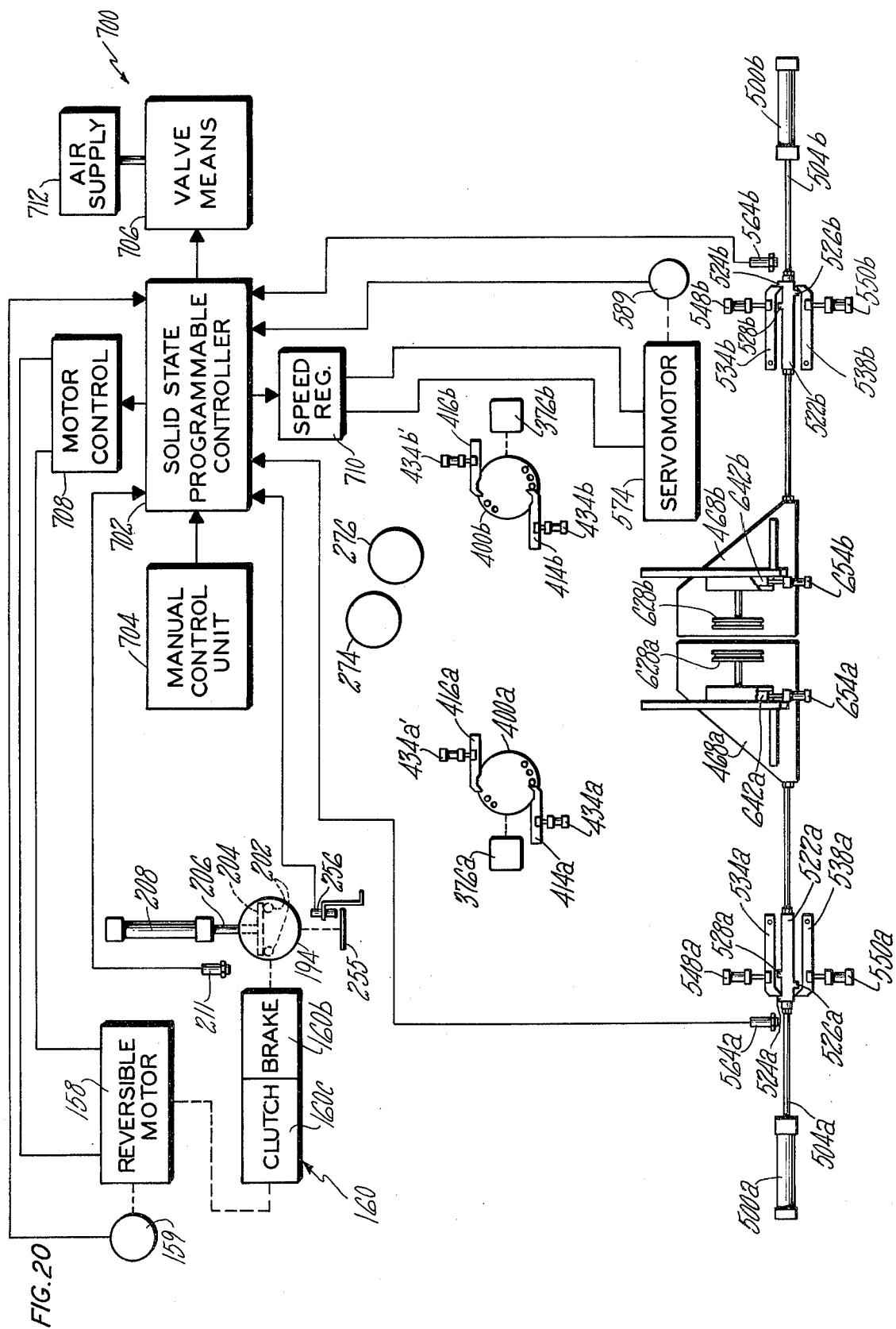
FIG. 20 is a simplified schematic illustration of the electrical and pneumatic control system for the apparatus of FIG. 8.

When the wire feed wheels 610a, 628a are driven with their respective bands 622a, 632a engaged, the bands drivingly engage the wire 90a disposed therebetween so as to withdraw it from a source and push it through the wire guide 672a into the nozzle assembly 26a. The capstan 626a which rotates in unison with the wire feed wheel 628a cooperates with the bands 622a, 632a in withdrawing the wire 90a from a supply source. When the supply source of wire 90a is exhausted, the piston rod 652 of cylinder 654a is retracted to separate the bands 622a, 632a thereby permitting the wire 90a of another supply source to be inserted between the bands for continued operation of the winding forming apparatus. The winding forming apparatus 10 together with the associated blade assemblies 12 on the turret 138 are preferably automatically controlled to form a complete set of pole winding groups for a motor by means of an automatic control system. Referring now to FIG. 20, one form of such an automatic control system 700 is shown diagrammatically in conjunction with various schematically illustrated operating elements of the apparatus 10. The control system 700 includes a solid state programmable controller 702 comprising a microcomputer such as the type PLS-400 systems available from PRO-LONG CORPORATION of Monterey, California. A manual control unit 704 is provided for entering into the controller 702 the desired parameters of the pole winding groups to be wound including the number of pole winding groups, the number of coils in each group, the number of turns in each coil, the circumference of each coil, and the lengths of the interpole connections and the pole winding starting and finishing leads. The controller 702 is also supplied control signals from the counting wheel pickup 256, the optical encoders 159 and 589 and the RF pickups 211, 564a and 564b as well as from additional sensors (not shown) associated with the turret 138 and the blade assembly 12 at the coil forming station of the turret 138. The controller 702 supplies appropriate control signals to valve means 706, a conventional motor control 708 for actuating the motor 158 for rotation at a low or high speed in either direction, and a conventional speed regulator 710 for controlling the speed of the servomotor 574. The valve means 706 comprise a plurality of conventional solenoid valves (not shown) selectively operable to control the connection to a compressed air supply 712 through suitable piping lines (not shown) of the clutch-brake mechanism 160, the clutches 274 and 276, the rotary actuators 376a and 376b, and the various air cylinders of the apparatus 10 shown in FIG. 20 as well as the indexing air cylinders (not shown) of the blade assembly 12 at the coil forming station of the turret 138. The clutch-brake mechanism 160 has a clutch 160C and a brake 160B which are separately actuated, the clutch 160C being interposed between the motor 158 and the brake 160B as indicated in FIG. 20. It is to be understood that the speed regulator 710 is controlled by the controller 702 to adjust the speed of the servomotor 574 so as to precisely maintain the speed of the servomotor 574 relative to the speed of the motor 158 at various predetermined speed ratios.

The method for operating the winding forming apparatus 10 in accordance with the present invention for the purpose of producing, for example, a set of four pole winding groups 130, 132, 134, 136 of three coils each as shown in FIG. 5 is as follows.

Assuming that the apparatus 10 has been in operation, the respective wires 90a, 90b will have been threaded through the nozzle assemblies and extend between the pairs of engaged bands 622a, 632a and 622b, 632b of the wire feed wheels. Also, the cam plate 230 will have been suitably positioned by the threaded rod 242 and the appropriate parameters will have been entered into the controller 702. The motor 158 is operating at its high speed but the clutch 160C will have been disengaged to prevent rotation of the drive gear 194. One of the clutches 274, 276 will have been actuated and the other deactuated by the valve means 706 to determine the proper direction of rotation of the nozzles 78a, 78b. The index plates 400a, 400b of the differential assemblies and the carriage members 468a, 468b will have been returned to their respective initial positions for forming of the largest coils 122, 128 shown in FIG. 5. In addition, the nozzles 78a, 78b will have been centered or positioned with their respective dispensing ends 82a, 82b disposed at the respective points of greatest angular rotation away from the axis 16 of the blade assembly 12-1.

Upon actuation of the manual control unit 704 to commence the winding forming operation, the servomotor 574 is initially actuated to cause the respective sets of wire feed wheels 610a, 628a and 610b, 628b to push out initial predetermined lengths of the wires 90a, 90b forming the start leads 720, 722 shown in FIG. 5. The brake 160B is then released and the clutch 160C is engaged to drive the nozzle assemblies 26a, 26b while at the same time the speed of the servomotor 574 is adjusted to a valve having a predetermined relationship to the speed of the motor 158. As the wires 90a, 90b are pushed through the respective rotating nozzles, 78a, 78b, the large coils 122, 128 are formed and accumulated in certain slots 18 of the blade assembly 12-1 as previously described. The counting wheel 255 with its photoelectric pickup 256 provides counting signals to the controller 702 equal in number to the number of turns in each coil 122, 128 by counting the number of revolutions of the shaft 252. When the controller 702 has received a number of counting signals less than the full number of turns required by a predetermined number, such as ten, the controller 702 actuates the motor control 708 to shift the motor 158 from high speed operation to low speed operation. The speed of the servomotor 574 is simultaneously reduced so as to maintain the speed ratio of the servomotor 574 and the motor 158 at the same value.

At the conclusion of the winding of the coils 122, 128 with the required number of turns, the controller 702 supplies control signals to the valve means 706 resulting in actuation of the cylinders 434a, 434b of the differential assemblies and in actuation of the cylinders 548a, 548b. As previously explained, actuation of the cylinders 434a, 434b results in an incremental angular rotation of each of the index plates 400a, 400b and the respective gear carrier arms 358a, 358b which in turn alters the angular relationship of the pulleys 182a, 184a and of the pulleys 182b, 184b to reduce the radial spacing between the dispensing end 82a and the axis 28a of nozzle assembly 26a and the radial spacing between the dispensing end 82b and the axis 28b of nozzle assembly 26b to the particular distance required for formation of the respective intermediate sized coils 120, 126. Also as previously explained, actuation of the cylinders 548a, 548b results in respective incremental forward movements of the carriage members 468a, 468b toward the axis 16 of the blade assembly 12-1 to position the nozzle assemblies 26a, 26b in the particular locations required for formation of the coils 120, 126. The motor 158 and the servomotor 574 are returned from low speed operation to high speed operation as these changes are made while at the same time the speed ratio of the servomotor 574 and the motor 158 is reduced to the value required for formation of the intermediate sized coils 120, 126.

The coils 120, 126 are now formed and accumulated in other certain slots 18 of the blade assembly 12 as previously described, the motor 158 and the servomotor 574 being shifted from high speed operation to low speed operation during formation of the final turns of the coils. At the conclusion of the winding of the coils 120, 126, the controller 702 supplies control signals to the valve means 706 resulting in actuation of the cylinders 434a', 434b' of the differential assemblies and in actuation of the cylinders 550a, 550b. It will be apparent that actuation of these cylinders results in a further reduction of the radial spacing between the dispensing end and rotational axis of each nozzle assembly 26a, 26b and in a further reduction in the spacing of each nozzle assembly from the axis 16 of the blade assembly 12-1 as required for formation of the smallest coils 110, 124. At the same time, motor 158 and the servomotor 574 are returned from low speed operation to high speed operation and the speed ratio of the servomotor 574 and the motor 158 is further reduced to the value required for formation of the smallest coils 110, 124. The coils 110, 124 are now formed and accumulated in still other certain slots 18 of the blade assembly 12-1 as previously described, the motor 158 and the servomotor 574 being shifted from high speed operation to low speed operation during formation of the final turns of the coils.

As the last turn of each coil 110, 124 is completed, the clutch 160C is disengaged and the brake 160B is actuated in response to control signals supplied by the controller 702 to the valve means 706, thereby stopping the nozzles 78a, 78b near their initial centered positions. The approximate positions at which the nozzles 78a, 78b stop are determined by a counting signal provided by the photoelectric pickup 256 and the counting wheel 255 which indicate the position of the shaft 252 as well as counting its revolutions. Since the main drive pulley 164 makes one complete revolution for each revolution of the shaft 252 due to their mechanical connection through the motion conversion mechanism 152, there is a predetermined relationship between the angular position of the shaft 252 and that of each nozzle 78a, 78b. Shortly after stopping of the nozzles 78a, 78b, the brake 160B is released and the cylinder 208 is actuated to extend the indexing block 204 into engagement with the cam rollers 202 on the drive gear 194, thereby centering or positioning the nozzles 78a, 78b with their respective dispensing ends 82a, 82b disposed at the respective points of greatest angular displacement away from the axis 16 of the blade assembly 12-1.

After the nozzles 78a, 78b are centered, the indexing block 204 is retracted and the blade assembly 12-1 is rotated or indexed 90° to the proper position for receiving the coils of the pole winding groups 134, 136. As the blade assembly 12-1 is indexed, the servomotor 574 is actuated to cause the respective sets of feed wheels 610a, 628a and 610b, 628b to push out predetermined lengths of the wires 90a, 90b forming the loops or interpole connections 724, 726 shown in FIG. 5. Simultaneously, the controller 702 supplies control signals to the valve means 706 resulting in actuation of each rotary actuator 376a, 376b in a reverse direction for return movements of the index plates 400a, 400b to their respective initial positions and in actuation of each cylinder 500a, 500b in a reverse direction for return movements of the carriages 468a, 468b to their respective initial positions. When the carriages 468a, 468b are fully retracted, the movement of the respective collars 572a, 572b of the cylinder piston rods into proximity with the R.F. pickups 564a, 564b causes the pickups to supply position signals to the controller 702. In response to these position signals, the controller 702 supplies control signals to the valve means which change the actuation of each of the rotary actuators 376a, 376b and the cylinders 500a, 500b to a forward direction. In addition, the controller 702 actuates the motor control 708 to shift the motor 158 from low speed operation to high speed operation and actuates the speed regulator 710 to adjust the speed ratio of the servomotor 574 and the motor 158 to the value required for formation of the largest coils of the pole winding groups 134, 136.

At this time, the clutch 160C is engaged and the pole winding groups 134, 136 are formed in the same manner as described above in connection with formation of the groups 130, 132. As the last turn of the smallest coil of each group 134, 136 is completed, the clutch 160C is disengaged and the brake 160B is actuated to stop the nozzles 78a, 78b near their centered positions. The brake 160B is then released and the cylinder 208 is actuated to center the nozzles 78a, 78b as previously described. Simultaneously, the servomotor 574 is actuated to cause the respective sets of wire feed wheels to push out predetermined lengths of the wires 90a, 90b which are suitably severed adjacent the nozzles 78a, 78b to form the respective finish leads 728, 730 shown in FIG. 5. At this time, the index plates 400a, 400b and the carriages 468a, 468b are returned to their respective initial positions to place the winding forming apparatus 10 in condition to form another set of pole winding groups.

Following the severing of the finish leads 728, 730, the turret 138 is rotated to advance the blade assembly 12-1 from the forming station under the nozzle assemblies 26a, 26b to a removal station and to concurrently advance the blade assembly 12-2 to the forming station. The blade assembly 12-1 with the pole winding groups is then removed from the turret 138 for transfer of the pole winding groups to conventional coil inserting apparatus (not shown). The empty blade assembly 12-1 may then be returned to the removal station on the turret 138.

It will be apparent that the blade assemblies 12-1, 12-2 may be of the general type shown in U.S. Pat. No. 3,324,536, and that complemental coil and wedge pushing apparatus of the general type shown in the aforesaid patent may be located at the coil removal station of the turret 138 for direct transfer there of the pole winding groups to a stator core member. Although the winding forming apparatus 10 has been described as having two nozzle assemblies 26a, 26b, it will be understood that various aspects of the present invention are applicable to similar apparatus having only a single nozzle assembly. It will also be apparent that the coil winding apparatus 10 may be employed to form pole winding groups each having less or more than three coils. The number and location of the indexing pins fitted in the index plates 400a, 400b may be varied. Also the detent bars 522a, 522b may be replaced by similar bars with other numbers of abutments differently spaced from each other. It will be further appreciated that a change in the spacings of the nozzle assemblies 26a, 26b from the axis 16 of the blade assembly 12 may not be required for all changes in the respective radial spacings of the dispensing ends 82a, 82b from the rotational axes 28a, 28b. It will also be seen that the low speed operation of the motor 158 in forming the final turns of the coils may not be required under some circumstances.

It will be seen from the foregoing that the invention provides a new and improved winding forming apparatus and winding forming method with which one or more coils of selectively variable configuration may be accurately and economically formed on the blades of coil transfer apparatus by a gentle wire pushing process which subjects the wire to far less abuse than prior apparatus which wound the wire under tension. Thus, it is possible to use less costly magnet wire having insulating coatings with good electrical properties but of less thickness or less abrasion resistance than previously required. In addition, the present invention overcomes the deficiencies of the apparatus disclosed in the aforesaid U.S. Pat. No. 3,903,933 and U.S. application Ser. No. 590,158, and provides an improved, extremely versatile apparatus which can be conveniently used in connection with a variety of dynamoelectric machine field windings, stator core lengths, wire sizes and coil transfer apparatus. The present invention is also well suited for automatically controlled operation or for a combination of manually and automatically controlled operation.

While the invention has been described with reference to a particular embodiment, it is to be understood that this description is made by way of example and not as a limitation to the scope of the invention.

What is claimed is:

1. The method of placing magnet wire in slots respectively defined by spaced blades of coil transfer apparatus to form a dynamoelectric machine field winding, said method comprising the steps of: (a) advancing said wire by pushing the same on its axis without applying tension thereto; (b) guiding said advancing wire through a rotating nozzle having a wire dispensing exit at a fixed radial distance from the rotational axis of said nozzle whereby said wire is pushed in a direction away from said dispensing exit; and (c) cyclically varying the relationship of the rate of said pushing to the angular velocity of said nozzle such that said wire is directed from said dispensing exit along a predetermined path having an alternately increasing and decreasing radius in relation to said rotational axis, said path having sections respectively aligned with the open ends of two of said slots whereby said wire is pushed into said slots through said open ends.

2. The method of claim 1 wherein said wire is pushed at a constant rate and said nozzle is rotated at an alternately increasing and decreasing speed.

3. The method of claim 1 wherein said blades lie on an imaginary cylinder in a cylindrical array and said path has sections respectively within and outside of said cylinder, said section of the path within said cylinder having varying radii shorter than the varying radii of said section of the path outside of said cylinder.

4. The method of claim 3 wherein said wire is pushed at a constant rate and said nozzle is rotated at an alternately increasing and decreasing speed.

5. The method of placing magnet wire in slots respectively defined by spaced, parallel blades of coil transfer apparatus which are arranged in a linear array having first and second opposite sides to form a dynamoelectric machine field winding having at least first and second differently sized, serially connected coils each having a number of turns, said method comprising the steps of: (a) advancing said wire by pushing the same on its axis without applying tension thereto; (b) guiding said advancing wire through a rotating nozzle having a wire dispensing exit at a first fixed radial distance from the rotational axis of said nozzle whereby said wire is pushed in a direction away from said dispensing exit, said rotational axis extending on said first side of said array of blades in generally parallel and spaced relation to the axes of said blades; establishing a first predetermined relationship of the rate of said pushing to the angular velocity of said nozzle such that said wire is directed from said dispensing exit along a first predetermined path of a first size having sections respectively aligned with the open ends of a first selected two of said slots whereby said wire is pushed into said first two slots through said open ends, said first path also having sections respectively on said first and second sides of said array of blades; (d) forming said first coil while maintaining said dispensing exit at said first fixed radial distance from said rotational axis and maintaining said first predetermined relationship of the rate of said pushing to the angular velocity of said nozzle; (e) after forming said first coil, concurrently shifting the dispensing exit of said nozzle to a second fixed radial distance from said rotational axis and establishing a second predetermined relationship of the rate of said pushing to the angular velocity of said nozzle such that said wire is directed from said dispensing exit along a second predetermined path of a second size having sections respectively aligned with the open ends of a second selected two of said slots whereby said wire is pushed into said second two slots through said open ends, said second path also having sections respectively on said first and second sides of said array of blades; and (f) forming said second coil while maintaining said dispensing exit at said second fixed radial distance from said rotational axis and maintaining said second predetermined relationship of the rate of said pushing to the angular velocity of said nozzle.

6. The method of claim 5 including the additional steps of: (g) controlling said first predetermined relationship of the rate of said pushing to the angular velocity of said nozzle in a cyclically varying manner such that said first predetermined path has an alternately increasing and decreasing radius in relation to said rotational axis, said section of said first path on said second side of said array of blades having varying radii shorter than the varying radii of said section of said first path on said first side of said array of blades; and (h) controlling said second predetermined relationship of the rate of said pushing to the angular velocity of said nozzle in a cyclically varying manner such that said second predetermined path has an alternately increasing and decreasing radius in relation to said rotational axis, said section of said second path on said second side of said array of blades having varying radii shorter than the varying radii of said section of said second path on said first side of said array of blades.

7. The method of claim 6 wherein said wire is pushed at a first constant rate and said nozzle is rotated at an alternately increasing and decreasing speed during step (g), and said wire is pushed at a second constant rate and said nozzle is rotated at an alternately increasing and decreasing speed during step (h).

8. The method of claim 5 including the additional steps of: (g) maintaining said rotational axis of said nozzle at a first selected distance from said array of blades during step (d); (h) concurrently with step (e) translationally moving said nozzle to position said rotational axis thereof at a second selected distance from said array of blades; and (i) maintaining said rotational axis of said nozzle at said second selected distance from said array of blades during step (f).

9. The method of claim 5 including the additional steps after forming of said first and second coils of: (g) shifting said coil transfer apparatus a predetermined extent relative to said rotational axis to locate a third selected two and a fourth selected two of said slots in the respective positions previously occupied by said first two and second two of said slots; (h) thereafter forming a third coil by advancing and guiding said wire along said first predetermined path whereby said wire is pushed into said third two slots; and (i) after forming said third coil, forming a fourth coil by advancing and guiding said wire along said second predetermined path whereby said wire is pushed into said fourth two slots.

10. The method of claim 9 including the additional step after forming of said second coil and prior to forming of said third coil of: (j) arresting the rotation of said nozzle and without severing the strand of wire from which said second coil was formed pushing from said dispensing exit a length of said wire in the form of a loop providing a connecting lead between said second and third coils.

11. Apparatus for placing magnet wire in slots respectively defined by spaced blades of coil transfer apparatus thereby to form a dynamoelectric machine field winding, said apparatus comprising: a rotatable nozzle having a wire dispensing exit at a fixed radial distance from the rotational axis of said nozzle for guiding said wire toward said blades; means for pushing said wire through said nozzle without applying tension thereto; and means cooperating with said pushing means and said rotating means for cyclically varying the relationship of the rate of said pushing to the angular velocity of said nozzle such that said wire is directed from said dispensing exit along a predetermined path having an alternately increasing and decreasing radius in relation to said rotational axis, said path having sections respectively aligned with the open ends of two of said slots whereby said wire is pushed into said slots through said open ends.

12. The apparatus of claim 11 wherein said cooperating means comprise means for alternately increasing and decreasing the angular velocity of said nozzle during each revolution of said nozzle.

13. The apparatus of claim 11 wherein said blades lie on an imaginary cylinder in a cylindrical array and said path has sections respectively within and outside of said cylinder, said cooperating means including means coordinating the rate of said pushing with the rotational movement of said nozzle in a manner such that the section of said path within said cylinder has varying radii shorter than the varying radii of the section of said path outside of said cylinder.

14. The apparatus of claim 13 wherein said rotating means includes a speed-changing mechanism for alternately increasing and decreasing the angular velocity of said nozzle during each revolution of said nozzle.

15. The apparatus of claim 11 wherein said pushing means includes variable-speed, rotatable first drive means for varying the rate of said pushing; wherein said rotating means includes second drive means rotatable at a predetermined substantially constant speed; and wherein said cooperating means includes speed regulating means for said first drive means to establish a selected fixed speed ratio of said first drive means to said second drive means; said cooperating means further including a motion conversion mechanism having a driven shaft rotated by said second drive means and a driving shaft coupled to said nozzle for rotating the same, the speed ratio of said driven shaft to said driving shaft alternately increasing and decreasing during each revolution of said driven shaft in a cyclically varying manner.

16. The apparatus of claim 15 wherein said motion conversion mechanism includes a flywheel member synchronously rotated with said driving shaft at the same mean speed but at a cyclically varying rotational speed alternately decreasing and increasing respectively as the rotational speed of said driving shaft alternately increases and decreases whereby the inertia effect of said flywheel acts in opposition to the inertia effect of said nozzle.

17. Apparatus for placing magnet wire in slots respectively defined by spaced, parallel blades of coil transfer apparatus which are arranged in a linear array having first and second opposite sides thereby to form a dynamoelectric machine field winding having at least first and second differently sized, serially connected coils each having a number of turns, said apparatus comprising: a rotatable nozzle having a wire dispensing exit radially spaced from the rotational axis of said nozzle for guiding said wire toward said blades; means rotatably supporting said nozzle with said rotational axis extending on said first side of said array of blades in generally parallel and spaced relation to said blades; means for pushing said wire through said nozzle without applying tension thereto; means for rotating said nozzle to move said dispensing exit relative to said blades in a circular course around said rotational axis; said rotating means including means for selectively moving said dispensing exit radially with respect to said rotational axis between a first radial position in which said pushed wire is directed from said dispensing exit along a first predetermined path to form said first coil and a second radial position in which said pushed wire is directed from said dispensing exit along a second predetermined path to form said second coil; and control means controlling said pushing means and said rotating means for selectively adjusting the relationship of the rate of said pushing to the angular velocity of said nozzle, said control means being effective when said dispensing exit is at said first radial position to cause said first predetermined path of wire directed from said dispensing exit to be of a first size having sections respectively aligned with the open ends of a first selected two of said slots whereby said wire is pushed into said first two slots through said open ends thereof, said first predetermined path also having sections respectively on said first and second sides of said array of blades; said control means being effective when said dispensing exit is at said second radial position to cause said second predetermined path of wire directed from said dispensing exit to be of a second size having sections respectively aligned with the open ends of a second selected two of said slots whereby said wire is pushed into said second two slots through said open ends thereof, said second predetermined path also having sections respectively on said first and second sides of said array of blades.

18. The apparatus of claim 17 wherein said rotating means includes a speed-changing mechanism for alternately increasing and decreasing the angular velocity of said nozzle during each revolution of said nozzle in a cyclical manner whereby each of said first and second predetermined paths has an alternately increasing and decreasing radius in relation to said rotational axis.

19. The apparatus of claim 18 wherein the section of each of said first and second predetermined paths on said second side of said array of blades has varying radii shorter than the varying radii of the section of the respective path on said first side of said array of blades.

20. The apparatus of claim 17 wherein said pushing means includes variable-speed, rotatable first dirve means for varying the rate of said pushing; wherein said rotating means includes second drive means rotatable at a predetermined substantially constant speed, said rotating means further including a motion conversion mechanism having a driven shaft rotated by said second drive means and a driving shaft coupled to said nozzle for rotating the same, the speed ratio of said driven shaft to said driving shaft alternately increasing and decreasing during each revolution of said driven shaft to thereby continuously vary the angular velocity of said nozzle in a cyclically varying manner; and wherein said control means established a selected first fixed speed ratio of said first drive means to said second drive means when said dispensing exit is at said first radial position for formation of said first coil, said control means establishing a selected second fixed speed ratio of said first drive means to said second drive means when said dispensing exit is at said second radial position for formation of said second coil.

21. The apparatus of claim 17 including means mounting said supporting means for selective translational movement of said nozzle relative to said array of blades to vary the spacing of said rotational axis from said array of blades; and means for moving said mounting means between a first selected position of said rotational axis at which said wire is directed from said dispensing exit along said first predetermined path for formation of said first coil and a second selected position of said rotational axis at which said wire is directed from said dispensing exit along said second predetermined path for formation of said second coil.

22. The apparatus of claim 17 wherein said means for rotating said nozzle includes first and second spindle means mounted in coaxial alignment for rotation about said rotational axis; first link means drivingly connecting said nozzle to said first spindle means to constrain said nozzle for rotation with said first spindle means but permitting radial movement of said nozzle relative to said rotational axis; second link means interconnecting said nozzle and said second spindle means for effecting radial movement of said nozzle relative to said rotational axis upon relative angular rotation between said first and second spindle means; and differential drive means for varying the angular relation between said first and second spindle means while rotating said first and second spindle means at the same speed.

23. The apparatus of claim 17 wherein said means for rotating said nozzle includes first and second spindles each rotatable about said rotational axis, one of said spindles being rotatably supported within the other, said first and second spindles having respective first and second axially spaced radial flanges; a first link having one end pivotally connected to said first flange at a point spaced from said rotational axis; a second link having an end pivotally connected to said nozzle at a point spaced from said rotational axis, the other ends of said first and second links being pivotally interconnected to constrain said nozzle for rotation with said first spindle but to permit radial movement of said nozzle relative to said rotational axis along a straight line of predetermined orientation with respect to said first flange; an operating third link having one end pivotally connected to said second flange at a point spaced from said rotational axis and having another end pivotally connected to said nozzle at a point spaced from said rotational axis and laterally offset from said straight line whereby a swinging force is applied to said third link during relative angular rotation between said first and second spindles to thereby effect radial movement of said nozzle relative to said rotational axis; and differential drive means for varying the angular relation between said first and second spindles while rotating said first and second spindles at the same speed.

24. The apparatus of claim 22 wherein said differential drive means includes a first driving member connected to one of said first and second spindle means for rotating the same; a second driving member connected to the other of said first and second spindle means for rotating the same; a rotatable driven member; means for driving said driven member; means fixedly connecting said first driving member to said driven member; transmission means connecting said second driving member to said driven member for rotation at the same speed as that of said driven member and permitting variation within certain limits of the relative angular relation therebetween; and indexing actuator means controlling said transmission means for selectively changing the angular relation of said second driving member to said driven member between a first angular position corresponding to the angular relation between said first and second spindle means required to locate said dispensing exit in said first radial position and a second angular position corresponding to the angular relation between said first and second spindle means required to locate said dispensing exit in said second radial position.

25. The apparatus of claim 24 wherein said means for driving said driven member includes means for selectively rotating said driven member in opposite directions.

26. The apparatus of claim 24 wherein said transmission means comprise a gear train connecting said driven member and said second driving member in driving engagement, said gear train including at least one gear rotatably supported on a gear carrier arm which is pivotally mounted to effect swinging movement of the axis of at least said one gear for varying the angular relation between said driven member and said second driving member; and wherein said indexing actuator means comprise an actuator connected to said gear carrier arm selectively operable to pivotally move said gear carrier arm in a first direction from a first position to a second position and to move said gear carrier arm in the opposite direction from said second position to said first position, an index member operably connected to said actuator for movement concurrently with said gear carrier arm between a third position corresponding to said first position of said gear carrier arm and a fourth position corresponding to said second position of said gear carrier arm, a first pawl movable between a stop position for engagement by said index member and a retracted position clear of said index member, said first pawl when in its stop position being located for engagement by said index member to selectively restrain said movement of said index member in said first direction to at least said third position, a second pawl located for engagement by said index member to selectively restrain said movement of said index member in said first direction to at least said fourth position, and means for moving said first pawl from its stop position to its retracted position to thereby disengage said first pawl from said index member and permit said movement of said index member in said first direction to said fourth position.

27. The apparatus of claim 17 for placing two magnet wires in slots respectively defined by spaced, parallel blades of coil transfer apparatus which are arranged on opposite sides of a central axis thereof in at least first and second linear arrays each having first and second opposite sides thereby to form a dynamoelectric machine field winding having at least two winding groups each comprising at least first and second differently sized, serially connected coils each having a number of turns, wherein there are two nozzles rotatably supported with their respective rotational axes extending in generally parallel but diametrically opposite spaced relation to said central axis; wherein there are two pushing means and two rotating means, one set thereof for each nozzle, said two pushing means respectively pushing one wire through one nozzle and the other wire through the other nozzle simultaneously at the same rate, said two rotating means simultaneously rotating said nozzles in synchronism with one another about said respective rotational axes, each of said rotating means including means for selectively moving the dispensing exit of the respective nozzle between said first and second radial positions thereof; wherein means are provided for causing said two moving means to concurrently move said dispensing exits between the respective said first and second radial positions; wherein said control means controls said sets of pushing means and rotating means in a manner such that said first and second predetermined paths of one wire directed from one dispensing exit are respectively identical in size and shape to said first and second predetermined paths of the other wire directed from the other dispensing exit; and wherein the set of first and second selected two of said slots in which said one wire is pushed and the set of first and second selected two of said slots in which said other wire is pushed are disposed on opposite sides of said central axis whereby said two winding groups may be simultaneously formed.

28. The apparatus of claim 27 including means for selectively rotating one of said rotating means in opposite directions.

29. The apparatus of claim 27 further including a carriage for supporting each nozzle for rotation about its respective rotational axis; means mounting each of said carriages for selective translational movement of the respective nozzle relative to said central axis; and means for moving each of said carriages between a first selected position where the rotational axis of said respective nozzle is located relative to its respective array of blades for formation of said first coil and a second selected position where the rotational axis of said respective nozzle is located relative to its respective array of blades for formation of said second coil.

30. The apparatus of claim 29 wherein each of said two pushing means comprises a pair of rollers rotatably supported on a respective one of said carriages and engaging a respective wire therebetween; means in driving engagement with at least one roller for rotating said rollers; and means for guiding said respective wire as it is advanced from said rollers to the respective nozzle.

31. The apparatus of claim 30 wherein said roller driving means of said two pushing means are coupled to a common drive shaft and longitudinally shiftable therealong to permit movement of said carriages relative to said arrays of blades; and wherein a variable-speed motor is operatively connected to said drive shaft for simultaneously rotating said pairs of rollers at the same speed.

32. The apparatus of claim 27 wherein each of said rotating means includes first and second spindle means mounted in coaxial alignment for rotation about the rotational axis of the respective nozzle; first link means drivingly connecting said respective nozzle to said first spindle means to constrain said respective nozzle for rotation with said first spindle means but permitting radial movement of said respective nozzle relative to the rotational axis thereof; said link means interconnecting said respective nozzle and said second spindle means for effecting radial movement of said respective nozzle relative to the rotational axis thereof upon relative angular rotation between said first and second spindle means; and differential drive means for varying the angular relation between said first and second spindle means while rotating said first and second spindle means at the same speed.

33. The apparatus of claim 32 wherein each of said differential drive means includes a first driving member connected to one of the respective first and second spindle means for rotating the same; a second driving member connected to the other of said respective first and second spindle means for rotating the same; a rotatable driven member; means for driving said driven member; means fixedly connecting said first driving member to said driven member; transmission means connecting said second driving member to said driven member for rotation at the same speed as that of said driven member and permitting variation within certain limits of the relative angular relation therebetween; and indexing actuator means controlling said transmission means for selectively changing the angular relation of said second driving member to said driven member between a first angular position corresponding to the angular relation between said respective first and second spindle means required to locate the respective dispensing exit in said first radial position and a second angular position corresponding to the angular relation between said respective first and second spindle means required to locate said respective dispensing exit in said second radial position.

34. The apparatus of claim 33 further including power drive means; and first and second means respectively coupling said driven members of said two differential drive means to said power drive means for simultaneous rotation of said driven members in synchronism with one another, one of said first and second coupling means including means for selectively rotating the respective driven member in opposite directions.

35. The apparatus of claim 34 wherein said power drive means includes motor means rotatable at a predetermined substantially constant speed and a motion conversion mechanism having an input shaft rotated by said rotor motor means and an output operatively connected to said first and second coupling means, the speed ratio of said input shaft to said output shaft alternately increasing and decreasing during each revolution of said output shaft to thereby continuously vary the angular velocity of said two nozzles in a cyclically varying manner whereby said respective predetermined first and second paths of wires directed from said dispensing exits each have an alternately increasing and decreasing radius in relation to the respective rotational axis.

36. The apparatus of claim 35 wherein a variable-speed rotating motor is operatively connected to said two pushing means for simultaneously varying the rate at which said two wires are pushed; and wherein said control means establishes a selected first fixed speed ratio of said variable-speed motor to said motor means when each said dispensing exit is at said first radial position for formation of said first coil, said control means establishing a selected second fixed speed ratio of said variable-speed motor to said motor means when each said dispensing exit is at said second radial position for formation of said second coil.

* * * * *